US006237006B1

United States Patent
Weinberg et al.

(10) Patent No.: US 6,237,006 B1
(45) Date of Patent: May 22, 2001

(54) METHODS FOR GRAPHICALLY REPRESENTING WEB SITES AND HIERARCHICAL NODE STRUCTURES

(75) Inventors: Amir Weinberg, Zoran; Michael Pogrebisky, Herzliya, both of (IL)

(73) Assignee: Mercury Interactive Corporation, Sunnyvale, CA (US)

( * ) Notice: Subject to any disclaimer, the term of this patent is extended or adjusted under 35 U.S.C. 154(b) by 0 days.

(21) Appl. No.: 09/437,562

(22) Filed: Nov. 10, 1999

Related U.S. Application Data

(63) Continuation of application No. 08/843,265, filed on Apr. 11, 1997, now Pat. No. 6,144,962.
(60) Provisional application No. 60/028,474, filed on Oct. 15, 1996.

(51) Int. Cl.[7] ............................. G06F 17/30; G06F 13/00; G06T 15/00
(52) U.S. Cl. ....................... 707/103; 707/100; 345/356; 345/419
(58) Field of Search .................................. 707/100, 103; 345/356, 419

(56) References Cited

U.S. PATENT DOCUMENTS 5,295,243  *  3/1994  Robertson et al. .................. 345/348
5,295,261     3/1994  Simonetti ................................ 707/2

(List continued on next page.)

OTHER PUBLICATIONS

"Getting Started" Manual for NetCarta WebMapper 1.0 for Windows NT/95, dated 1996.
User's Guide for NetCarta WebMapper 1.0 for Windows NT/95, dated 1996.
Product packaging (front and back) for NetCarta WebMapper 1.0, dated 1996.
"Getting Started" Guide for InContext WebAnalyzer 1.0, dated 1996.

(List continued on next page.)

Primary Examiner—Thomas Black
Assistant Examiner—Frantz Coby
(74) Attorney, Agent, or Firm—Knobbe, Martens, Olson & Bear, LLP.

(57) ABSTRACT

A visual Web site analysis program, implemented as a collection of software components, provides a variety of features for facilitating the analysis and management of web sites and Web site content. A mapping component scans a Web site over a network connection and builds a site map which graphically depicts the URLs and links of the site. Site maps are generated using a unique layout and display methodology which allows the user to visualize the overall architecture of the Web site. Various map navigation and URL filtering features are provided to facilitate the task of identifying and repairing common Web site problems, such as links to missing URLs. A dynamic page scan feature enables the user to include dynamically-generated Web pages within the site map by capturing the output of a standard Web browser when a form is submitted by the user, and then automatically resubmitting this output during subsequent mappings of the site. The Web site analysis program is implemented using an extensible architecture which includes an API that allows plug-in applications to manipulate the display of the site map. Various plug-ins are provided which utilize the API to extend the functionality of the analysis program, including an action tracking plug-in which detects user activity and behavioral data (link activity levels, common site entry and exit points, etc.) from server log files and then superimposes such data onto the site map.

37 Claims, 24 Drawing Sheets

Microfiche Appendix Included
(1 Microfiche, 45 Pages)

U.S. PATENT DOCUMENTS

| | | | |
|---|---|---|---|
| 5,333,254 | * 7/1994 | Robertson | 345/356 |
| 5,388,255 | 2/1995 | Pytlik et al. | 707/4 |
| 5,515,488 | 5/1996 | Hoppe e tal. | 345/440 |
| 5,524,202 | 6/1996 | Yokohama | 707/104 |
| 5,544,310 | 8/1996 | Forman et al. | 714/31 |
| 5,546,529 | 8/1996 | Bowers et al. | 345/348 |
| 5,590,250 | * 12/1996 | Lamping et al. | 345/427 |
| 5,619,632 | 4/1997 | Lamping et al. | 345/441 |
| 5,786,820 | * 7/1998 | Robertson | 345/357 |
| 5,870,559 | 2/1999 | Leshem et al. | 709/224 |
| 6,144,962 | * 11/2000 | Weinberg et al. | 707/104 |

OTHER PUBLICATIONS

Print–out of online help manual for InContext WebAnalyzer 1.0 product (taken from CD–ROM, dated 1996).

Product packaging (front and back) for InContext WebAnalyzer 1.0, dated 1996.

Article titled "Top Tools to Manage your Web Site," Netguide Magazine, dated Apr. 1997.

Selected documents from Microsoft.com Web Site describing Microsoft FrontPage 1.1, downloaded and printed on Oct. 8, 1996 (5 printed pages).

Document titled "XSoft Licenses Information Visualization Technology to NetCarta Corp.", printed from NetCarta.com Website, dated Sep. 17, 1996.

Press release titled "Ararat Software Announces Availability of Inwebstigator 1.0", printed from Ararat.com Website, dated Sep. 23, 1996.

Document titled "Incontext Announces WebAnalyzer for Windows 95", dated Feb. 15, 1996.

Press release titled "Mercury Interactive Announces Industry's First Testing Technology for the Web", dated Jan. 1, 1996.

Press release titled "Mercury Interactive Makes Stress Testing a Web Site Simple and Affordable; Astra Site Test Generates over 4 Million Hits Using a Single Windows 95 or NT Work Station", dated Dec. 9, 1996.

Press release titled "Out–of–Control Web Sites Made More Effective, Profitable with New Web Management Tool; Mercury Interactive's Astra Instantly Pinpoints Problems and Displays User–Behavior Patterns for Higher Quality Web Sites", dated Oct. 9, 1996.

Press release titled "Tool For Webmasters Provides Open API For Java, C++ and Visual Basic Developers; Mercury Interactive Announces Astra Industry's First, Comprehensive, Graphical Web Management Tool", dated Oct. 9, 1996.

Press release titled "Webmasters Eager for Site Management Solutions Rally Around New Web Management Tool; Mercury Interactive Ships Astra SiteManager, Developers Begin Leveraging Open API", dated Dec. 9, 1996.

Product brochure for Astra SiteManager, dated 1997.

Product brochure for net.Analysis product of net. Genesis (undated).

Product brochure for CyberPilot Pro Product of NetsCarta (undated).

Article entitled "Web Site Management betas show major advances," dated Nov. 11, 1996 in PC Week.

Zaiane, Xin and Han. Discovering Web Access Patterns and Trends by Applying OLAP and Data Mining Technology on Web Logs, Proceedings of the IEEE Forum on Research and Technology Advances in Digital Libraries (IEEE ADL 98). pp. 19–29 (1998).

Ben Shneiderman, Tree Visualization with Tree–Maps: 2–d Space–Filling Approach, ACM transactions on Graphics, vol. 11, No. 1, pp. 92–99, Jan. 1992.

Munzer et al., "Visualizing the Structure of the World Wide Web in 3D Hyerbolic Space", The Geometric Center, University of Minnesota; Department of Mathematics, University of Utah, Printed Pages Labeled 1–20, Nov. 1995.*

* cited by examiner

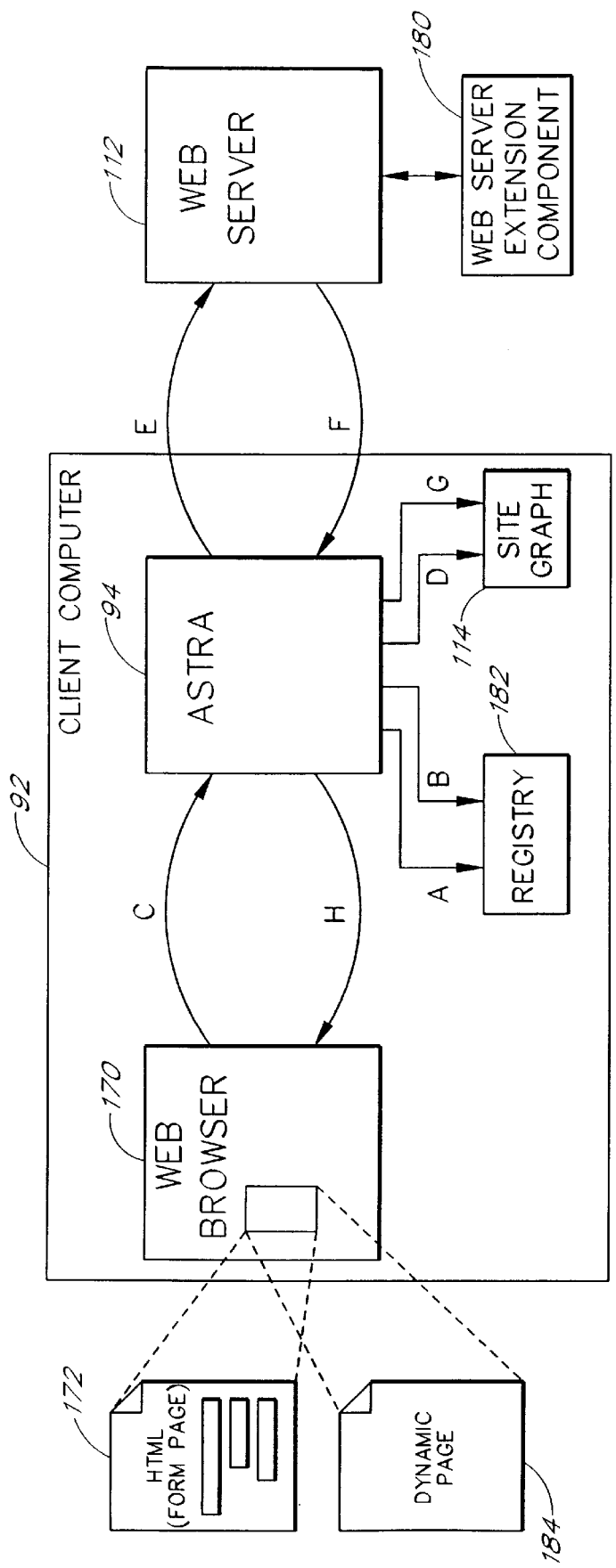

FIG. 12

A. ASTRA MODIFIES BROWSER CONFIGURATION IN REGISTRY TO SET ASTRA AS PROXY
B. ASTRA LAUNCHES BROWSER, AND THEN RESTORES ORIGINAL BROWSER CONFIGURATION WITHIN REGISTRY
C. BROWSER PASSES HTTP MESSAGE TO ASTRA IN RESPONSE TO SUBMISSION OF FORM
D. ASTRA EXTRACTS DATA SET AND STORES IN SITE GRAPH FOR FUTURE USE
E. ASTRA FORWARDS HTTP MESSAGE TO WEB SERVER
F. WEB SERVER RETURNS DYNAMICALLY-GENERATED WEB PAGE
G. WEB SERVER PARSES DYNAMICALLY-GENERATED PAGE AND UPDATES SITE GRAPH
H. ASTRA FORWARDS PAGE TO BROWSER TO CREATE IMPRESSION OF REGULAR BROWSING

METHODS FOR GRAPHICALLY REPRESENTING WEB SITES AND HIERARCHICAL NODE STRUCTURES

PRIORITY CLAIM

This application is a continuation of Application Ser. No. 08/843,265 filed Apr. 11, 1997, now U.S. Pat. No. 6,144,962 which claims the benefit of U.S. Provisional Application No. 60/028,474 titled SOFTWARE SYSTEM AND ASSOCIATED METHODS FOR FACILITATING THE ANALYSIS AND MANAGEMENT OF WEB SITES, filed Oct. 15, 1996, which is hereby incorporated by reference.

MICROFICHE APPENDIX

This specification includes a microfiche appendix (consisting of 1 sheet with 45 frames) which contains a partial source code listing and an API (application program interface) listing of a preferred embodiment of the invention, as Appendices A and B, respectively. These materials form part of the disclosure of the specification.

FIELD OF THE INVENTION

The present invention relates generally to database management, analysis and visualization tools. More particularly, the present invention relates to software tools for facilitating the management and analysis of World Wide Web sites and other types of database systems which utilize hyperlinks to facilitate user navigation.

BACKGROUND OF THE INVENTION

With the increasing popularity and complexity of Internet and intranet applications, the task of managing Web site content and maintaining Web site effectiveness has become increasingly difficult. Company Webmasters and business managers are routinely faced with a wide array of burdensome tasks, including, for example, the identification and repair of large numbers of broken links (i.e., links to missing URLs), the monitoring and organization of large volumes of diverse, continuously-changing Web site content, and the detection and management of congested links. These problems are particularly troublesome for companies that rely on their respective Web sites to provide mission-critical information and services to customers and business partners.

Several software companies have developed software products which address some of these problems by generating graphical maps of Web site content and providing tools for navigating and managing the content displayed within the maps. Examples of such software tools include WebMapper™ from Netcarta Corporation and WebAnalyzer™ from InContext Corporation. Unfortunately, the graphical site maps generated by these products tend to be difficult to navigate, and fail to convey much of the information needed by Webmasters to effectively manage complex Web sites. As a result, many companies continue to resort to the burdensome task of manually generating large, paper-based maps of their Web sites. In addition, many of these products are only capable of mapping certain types of Web pages, and do not provide the types of analysis tools needed by Webmasters to evaluate the performance and effectiveness of Web sites.

The present invention addresses these and other limitations in existing products and technologies.

SUMMARY OF THE INVENTIVE FEATURES

In accordance with the present invention, a software package ("Web site analysis program") is provided which includes a variety of features for facilitating the management and analysis of Web sites. In the preferred embodiment, the program runs on a network-connected PC under the Windows® 95 or Windows® NT operating system, and utilizes the standard protocols and conventions of the World Wide Web ("Web"). In other embodiments, the program may be adapted to provide for the analysis of other types of hypertextual-content sites, including sites based on non-standard protocols.

In the preferred embodiment, the program includes Web site scanning routines which use conventional webcrawling techniques to gather information about the content objects (HTML documents, GIF files, etc.) and links of a Web site via a network connection. Mapping routines of the program in-turn use this information to generate, on the computer's display screen, a graphical site map that shows the overall architecture (i.e., the structural arrangement of content objects and links) of the Web site. A user interface of the program allows the user to perform actions such as initiate and pause the scanning/mapping of a Web site, zoom in and out on portions of a site map, apply content filters to the site map to filter out content objects of specific types, and save and retrieve maps to/from disk. A map comparison tool allows the user to generate a comparison map which highlights changes that have been made to the Web site since a previous mapping of the site.

In accordance with one aspect of the invention, the Web site analysis program implements a map generation method which greatly facilitates the visualization by the user of the overall architecture of the Web site, and allows the user to navigate the map in an intuitive manner to explore the content of the Web site. To generate the site map, a structural representation of the Web site (specifying the actual arrangement of content objects and links) is initially reduced, for purposes of generating the site map, to a hierarchical tree representation in which each content object of the Web site is represented as a node of the tree. A recursive layout method is then applied which uses the parent-child node relationships, as such relationships exist within the tree, to spatially position the nodes (represented as respective icons within the map) on the display screen such that children nodes are positioned around and connected to their respective immediate parents. (This layout method can also be used to display other types of hierarchical data structures, such as the tree structure of a conventional file system.) The result is a map which comprises a hierarchical arrangement of parent-child node (icon) clusters in which parent-child relationships are immediately apparent.

As part of the layout method, the relative sizes of the node icons are preferably adjusted such that nodes with relatively large numbers of outgoing links have a relatively large icon size, and thus stand out in the map. In addition, the node and link display sizes are automatically adjusted such that the entire map is displayed on the display screen, regardless of the size of the Web site. As the user zooms in on portions of the map, additional details of the Web site's content objects are automatically revealed within the map.

In accordance with another aspect of the invention, the Web site analysis program is based on an extensible architecture that allows software components to be added that make extensive use of the program's mapping fuictionality. Specifically, the architecture includes an API (application program interface) which includes API procedures ("methods") that allow other applications ("plug-ins") to, among other things, manipulate the display attributes of the nodes and links within a site map. Using these methods, a plug-in application can be added which dynamically superimposes data onto the site map by, for example, selectively modifying display colors of nodes and links, selectively hiding nodes and links, and/or attaching alphanumeric annotations to the nodes and links. The API also includes methods for allowing plug-in components to access Web site data (both during and following the Web site scanning process) retrieved by the scanning routines, and for adding menu commands to the user interface of the main program.

In accordance with another aspect of the invention, software routines (preferably implemented within a plug-in application) are provided for processing a Web site's server access log file to generate Web site usage data, and for displaying the usage data on a site map. This usage data may, for example, be in the form of the number of "hits" per link, the number of Web site exit events per node, or the navigation paths taken by specific users ("visitors"). This usage data is preferably generated by processing the entries within the log file on a per-visitor basis to determine the probable navigation path taken by each respective visitor to the Web site. (Standard-format access log files which record each access to any page of the Web site are typically maintained by conventional Web servers.) In a preferred implementation, the usage data is then superimposed onto the site map (using the API methods) using different node and link display colors to represent different respective levels of user activity. Using this feature, Webmasters can readily detect common "problem areas" such as congested links and popular Web site exit points. In addition, by looking at individual navigation paths on a per-visitor basis, Webmasters can identify popular navigation paths taken by visitors to the site.

In accordance with yet another aspect of the invention, the Web site analysis program includes software routines and associated user interface controls for automatically scanning and mapping dynamically-generated Web pages, such as Web pages generated "on-the-fly" in response to user-specified database queries. This feature generally involves the two-step process of capturing and recording a dataset manually entered by the user into an embedded form of a Web page (such as a page of a previously-mapped Web site), and then automatically resubmitting the dataset (within the form) when the Web site is later re-scanned. As will be appreciated, this feature of the invention can also be applied to conventional Internet search engines.

To effectuate the capture of one or more datasets in the preferred implementation, the user initiates a capture session from the user interface; this causes a standard Web browser to be launched and temporarily configured to use the Web site analysis program as an HTTP-level proxy to communicate with Web sites. Thereafter, until the capture session is terminated by the user, any pages retrieved with the browser, and any forms (datasets) submitted from the browser, are automatically recorded by the Web site analysis program into the site map. When the site map is subsequently updated (using an "automatic update" option of the user interface), the scanning routines automatically re-enter the captured datasets into the corresponding forms and recreate the form submissions. The dynamically-generated Web pages returned in response to these automatic form submissions are then added to the updated site map as respective nodes. A related aspect of the invention involves the associated method of locally capturing the output of the Web browser to generate a sequence that can subsequently be used to automatically evaluate a Web site.

BRIEF DESCRIPTION OF THE DRAWINGS

The various features of the invention will now be described in greater detail with reference to the drawings of a preferred software package referred to as the Astra™ SiteManager™ Web site analysis tool ("Astra"), its screen displays, and various related components. In these drawings, reference numbers are re-used, where appropriate, to indicate a correspondence between referenced items.

FIG. 12 is a flow diagram which further illustrates the method for scanning dynamically-generated Web pages.

Figure 1:
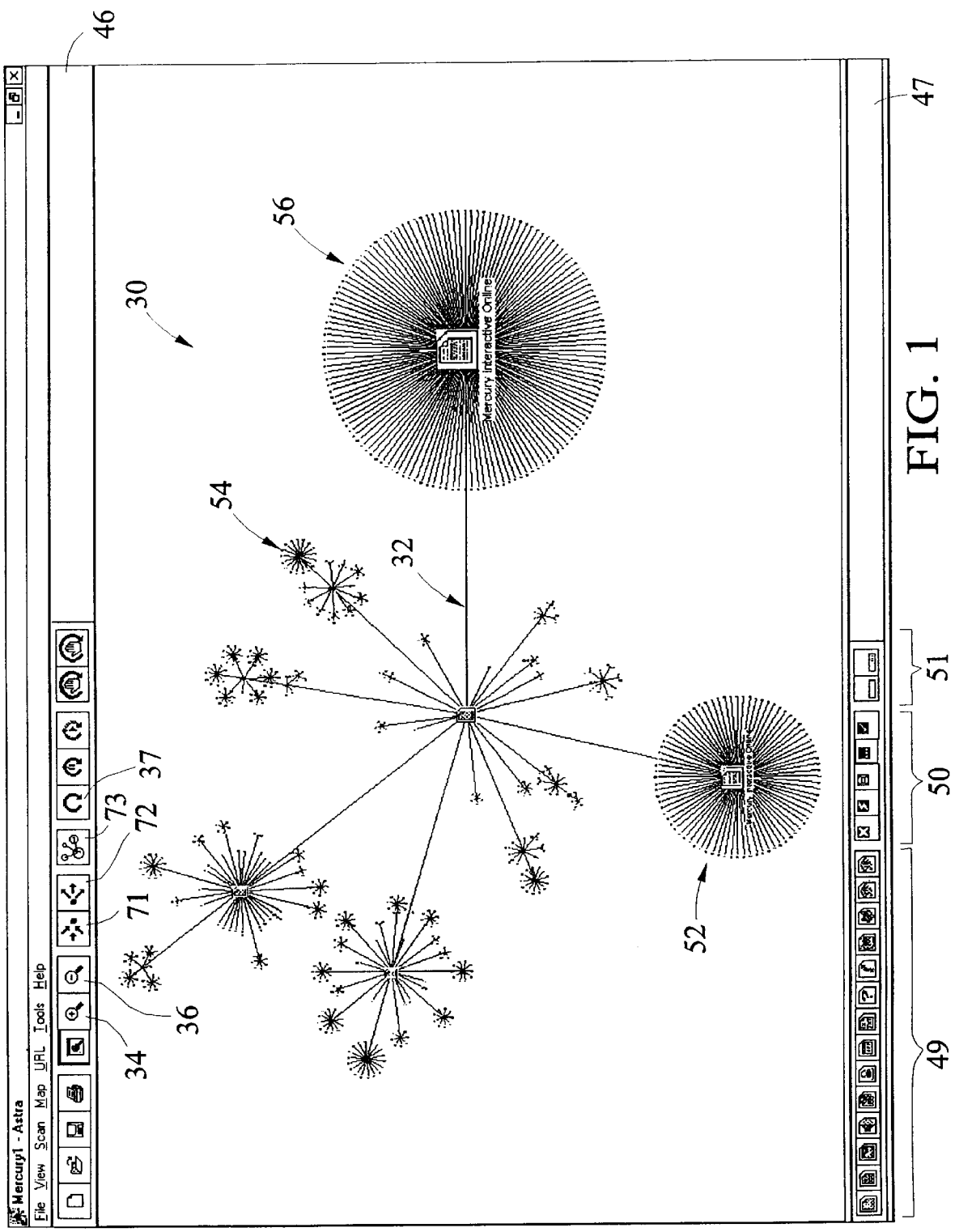
FIG. 1 is a screen display which illustrates an example Web site map generated by Astra, and which illustrates the menu, tool and filter bars of the Astra graphical user interface.

The screen displays included in the figures were generated from screen captures taken during the execution of the Astra code. In order to comply with patent office standards, the original screen captures have been modified to reduce shading and to replace certain color-coded regions with appropriate cross hatching. All copyrights in these screen displays are hereby reserved.

DETAILED DESCRIPTION OF THE PREFERRED EMBODIMENTS

The description of the preferred embodiments is arranged within the following sections:

- I. Glossary of Terms and Acronyms
- II. Overview
- III. Map Layout and Display Methodology
- IV. Astra Graphical User Interface
- V. Astra Software Architecture
- VI. Scanning Process
- VII. Scanning and Mapping of Dynamically-Generated Pages
- VIII. Display of Filtered Maps
- IX. Tracking and Display of Visitor Activity
- X. Map Comparison Tool
- XI. Link Repair Plug-in
- XII. Conclusion

I. Glossary of Terms and Acronyms

The following definitions and explanations provide background information pertaining to the technical field of the present invention, and are intended to facilitate an understanding of both the invention and the preferred embodiments thereof. Additional definitions are provided throughout the detailed description.

Internet. The Internet is a collection of interconnected public and private computer networks that are linked together by a set of standard protocols (such as TCP/IP, HTTP, FTP and Gopher) to form a global, distributed network.

Document. Generally, a collection of data that can be viewed using an application program, and that appears or is treated as a self-contained entity. Documents typically include control codes that specify how the document content is displayed by the application program. An "HTML document" is a special type of document which includes HTML (HyperText Markup Language) codes to permit the document to be viewed using a Web browser program. An HTML document that is accessible on a World Wide Web site is commonly referred to as a "Web document" or "Web page." Web documents commonly include embedded components, such as GIF (Graphics Interchange Format) files, which are represented within the HTML coding as links to other URLs. (See "HTML" and "URL" below.)

Hyperlink. A navigational link from one document to another, or from one portion (or component) of a document to another. Typically, a hyperlink is displayed as a highlighted word or phrase that can be clicked on using the mouse to jump to the associated document or document portion.

Hypertext System. A computer-based informational system in which documents (and possibly other types of data entities) are linked together via hyperlinks to form a user-navigable, "web." Although the term "text" appears within "hypertext," the documents and hyperlinks of a hypertext system may (and typically do) include other forms of media. For example, a hyperlink to a sound file may be represented within a document by graphic image of an audio speaker.

World Wide Web. A distributed, global hypertext system, based on an set of standard protocols and conventions (such as HTTP and HTML, discussed below), which uses the Internet as a transport mechanism. A software program which allows users to request and view World Wide Web ("Web") documents is commonly referred to as a "Web browser," and a program which responds to such requests by returning ("serving") Web documents is commonly referred to as a "Web server."

Web Site. As used herein, "web site" refers generally to a database or other collection of inter-linked hypertextual documents ("web documents") and associated data entities, which is accessible via a computer network, and which forms part of a larger, distributed informational system. Depending upon its context, the term may also refer to the associated hardware and/or software server components used to provide access to such documents. When used herein with initial capitalization (i.e., "Web site"), the term refers more specifically to a web site of the World Wide Web. (In general, a Web site corresponds to a particular Internet domain name, such as "merc-int.com," and includes the content of or associated with a particular organization.) Other types of web sites may include, for example, a hypertextual database of a corporate "intranet" (i.e., an internal network which uses standard Internet protocols), or a site of a hypertext system that uses document retrieval protocols other than those of the World Wide Web.

Content Object. As used herein, a data entity (document, document component, etc.) that can be selectively retrieved from a web site. In the context of the World Wide Web, common types of content objects include HTML documents, GIF files, sound files, video files, Java applets and aglets, and downloadable applications, and each object has a unique identifier (referred to as the "URL") which specifies the location of the object. (See "URL" below.)

URL (Uniform Resource Locator). A unique address which fully specifies the location of a content object on the Internet. The general format of a URL is protocol://machine-address/path/filename. (As will be apparent from the context in which it is used, the term "URL" is also used herein to refer to the corresponding content object itself.)

Graph/Tree. In the context of database systems, the term "graph" (or "graph structure") refers generally to a data structure that can be represented as a collection of interconnected nodes. As described below, a Web site can conveniently be represented as a graph in which each node of the graph corresponds to a content object of the Web site, and in which each interconnection between two nodes represents a link within the Web site. A "tree" is a specific type of graph structure in which exactly one path exists from a main or "root" node to each additional node of the structure. The terms "parent" and "child" are commonly used to refer to the interrelationships of nodes within a tree structure (or other hierarchical graph structure), and the term "leaf" or "leaf node" is used to refer to nodes that have no children. For additional information on graph and tree data structures, see Alfred V. Aho et al, *Data Structures and Algorithms*, Addison-Wesley, 1982.

TCP/IP (Transfer Control Protocol/Internet Protocol). A standard Internet protocol which specifies how computers exchange data over the Internet. TCP/IP is the lowest level data transfer protocol of the standard Internet protocols.

HTML (HyperText Markup Language). A standard coding convention and set of codes for attaching presentation and linking attributes to informational content within documents. During a document authoring stage, the HTML codes (referred to as "tags") are embedded within the informational content of the document. When the Web document (or "HTML document") is subsequently transmitted by a Web server to a Web browser, the codes are interpreted by the browser and used to parse and display the document. In addition to specifying how the Web browser is to display the document, HTML tags can be used create hyperlinks to other Web documents. For more information on HTML, see Ian S. Graham, *The HTML Source Book*, John Wiley and Sons, Inc., 1995 (ISBN 0471-11894-4).

HTTP (Hypertext Transfer Protocol). The standard World Wide Web client-server protocol used for the exchange of information (such as HTML documents, and client requests for such documents) between a Web browser and a Web server. HTTP includes several different types of messages which can be sent from the client to the server to request different types of server actions. For example, a "GET" message, which has the format GET <URL>, causes the server to return the content object located at the specified URL.

Webcrawling. Generally, the process of accessing and processing web site content (typically using an automated searching/parsing program) and generating a condensed representation of such content. Webcrawling routines are commonly used by commercial Internet search engines (such as Infoseek™ and Alta Vista™) to generate large indexes of the terms that appear within the various Web pages of the World Wide Web.

API (Application Program Interface). A software interface that allows application programs (or other types of programs) to share data or otherwise communicate with one another. A typical API comprises a library of API functions or "methods" which can be called in order to initiate specific types of operations.

CGI (Common Gateway Interface). A standard interface which specifies how a Web server (or possibly another information server) launches and interacts with external programs (such as a database search engine) in response to requests from clients. With CGI, the Web server can serve information which is stored in a format that is not readable by the client, and present such information in the form of a client-readable Web page. A CGI program (called a "CGI script") may be invoked, for example, when a Web user fills out an on-screen form which specifies a database query. For more information on CGI, see Ian S. Graham, *The HTML Source Book*, John Wiley and Sons, Inc., 1995 (ISBN 0471-11894-4), pp. 231–278.

OLE (Object Linking and Embedding). An object technology, implemented by Windows-based applications, which allows objects to be linked to one another and embedded within one another. OLE Automation, which is a feature of OLE 2, enables a program's functionality to be exposed as OLE objects that can be used to build other applications. For additional information on OLE and OLE Automation, see *OLE 2 Programmer's Reference Manual, Volume One*, Microsoft Corporation, 1996 (ISBN 1-55615-628-6).

II. Overview

The present invention provides a variety of software-related features for facilitating the mapping, analysis and management of Web sites. In the preferred embodiment, these features are embodied within a software package which runs on a client computer under either the Windows® NT or the Windows® 95 operating system. The software package is referred to herein as "Astra."

Given the address of a Web site's home page, Astra automatically scans the Web site and creates a graphical site map showing all of the URLs of the site and the links between these URLs. In accordance with one aspect of the invention, the layout and display method used by Astra for generating the site map provides a highly intuitive, graphical representation which allows the user to visualize the layout of the site. Using this mapping feature, in combination with Astra's powerful set of integrated tools for navigating, filtering and manipulating the Web site map, users can intuitively perform such actions as isolate and repair broken links, focus in on Web pages (and other content objects) of a particular content type and/or status, and highlight modifications made to a Web site since a prior mapping. In addition, users can utilize a Dynamic Scan™ feature of Astra to automatically append dynamically-generated Web pages (such as pages generated using CGI scripts) to their maps. Further, using Astra's activity monitoring features, users can monitor visitor activity levels on individual links and URLs, and study visitor behavior patterns during Web site visits.

In accordance with another aspect of the invention, Astra has a highly extensible architecture which facilitates the addition of new tools to the Astra framework. As part of this architecture, a "core" Astra component (which includes the basic Web site scanning and mapping functionality) has an API for supporting the addition of plug-in components. This API includes functions for allowing the plug-in components to manipulate the display of the site map, and to display their own respective data in conjunction with the Astra site map. Through this API, new applications can be added which extend the functionality of the package while taking advantage of the Astra mapping scheme.

Throughout this description, preliminary names of product features and software components are used with initial capitalization. These names are used herein for ease of description only, and are not intended to limit the scope of the invention.

Figure 2:
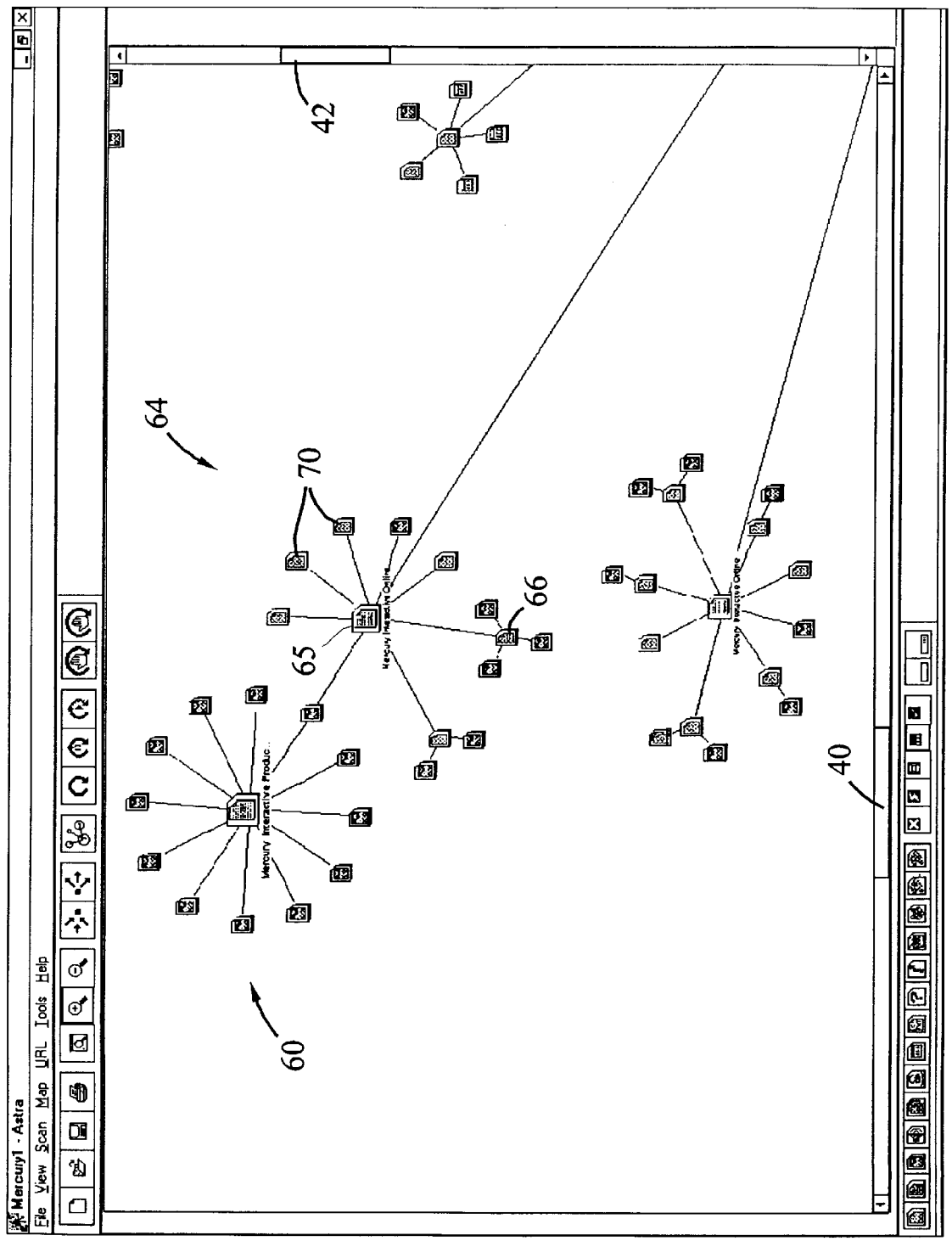
FIGS. 2 and 3 are screen displays which illustrate respective zoomed-in views of the site map of FIG. 1.
Figure 3:
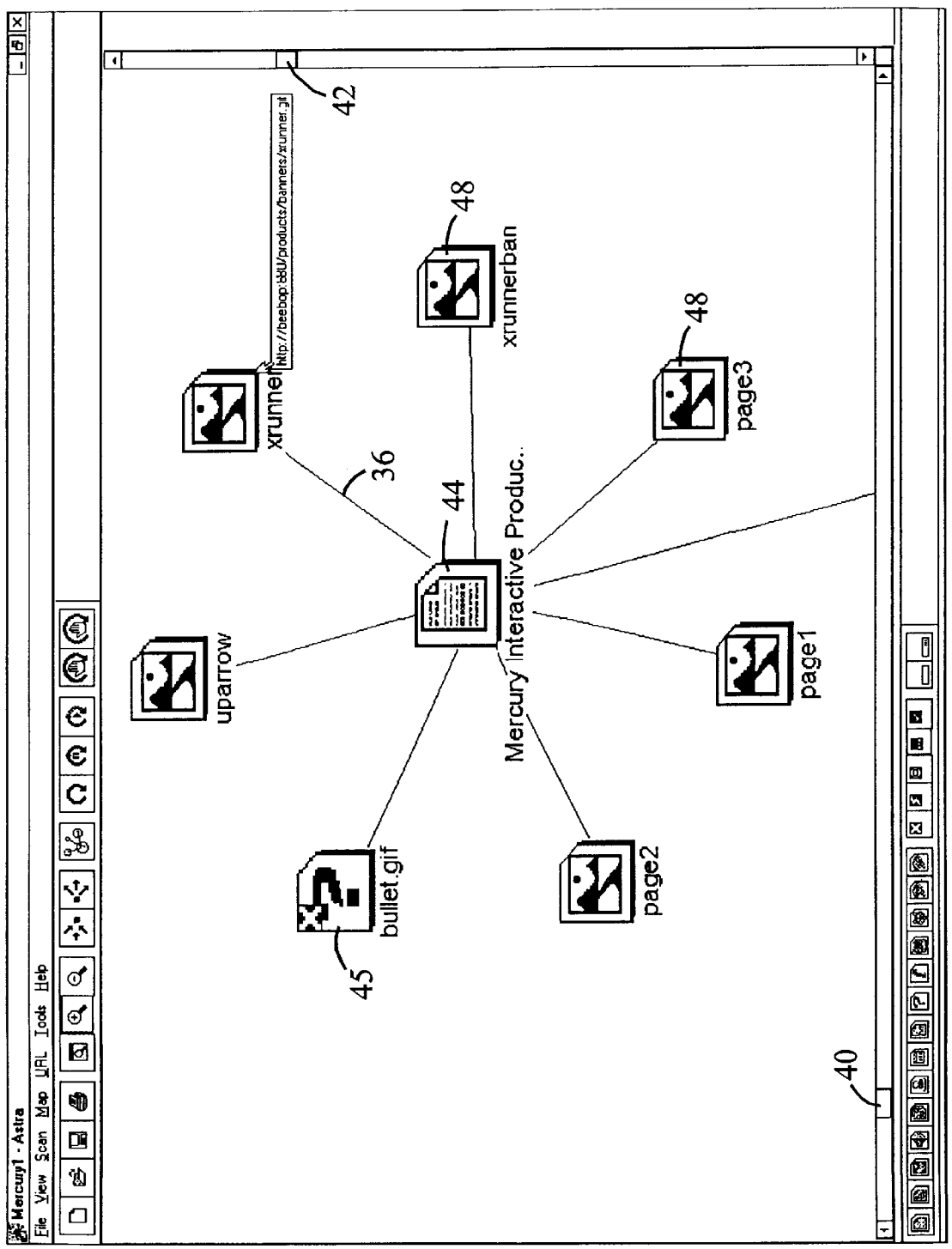

FIGS. 1–3 illustrate Astra's primary layout methodology, referred to herein as "Visual Web Display™," for displaying graphical representations ("maps") of Web sites. These figures will also be used to describe some of the graphical user interface (GUI) features of Astra.

FIG. 1 illustrates a site map 30 of a demonstration Web site which was derived from the actual Web site of Mercury Interactive, Inc. (i.e., the URLs accessible under the "merc-int.com" Internet domain name). (For purposes of this detailed description, it may be assumed that "Web site" refers to the content associated with a particular Internet domain name.) The Web site is depicted by Astra as a collection of nodes, with pairs of nodes interconnected by lines. Each node of the map represents a respective content object of the Web site and corresponds to a respective URL. (The term "URL" is used herein to refer interchangeably to both the address of the content object and to the object itself; where a distinction between the two is helpful to an understanding of the invention, the term "URL" is followed by an explanatory parenthetical.) Examples of URLs (content objects) which may exist within a typical Web site include HTML documents (also referred to herein as "Web pages"), image files (e.g., GIF and PCX files), mail messages, Java applets and aglets, audio files, video files, and applications.

Figure 4:
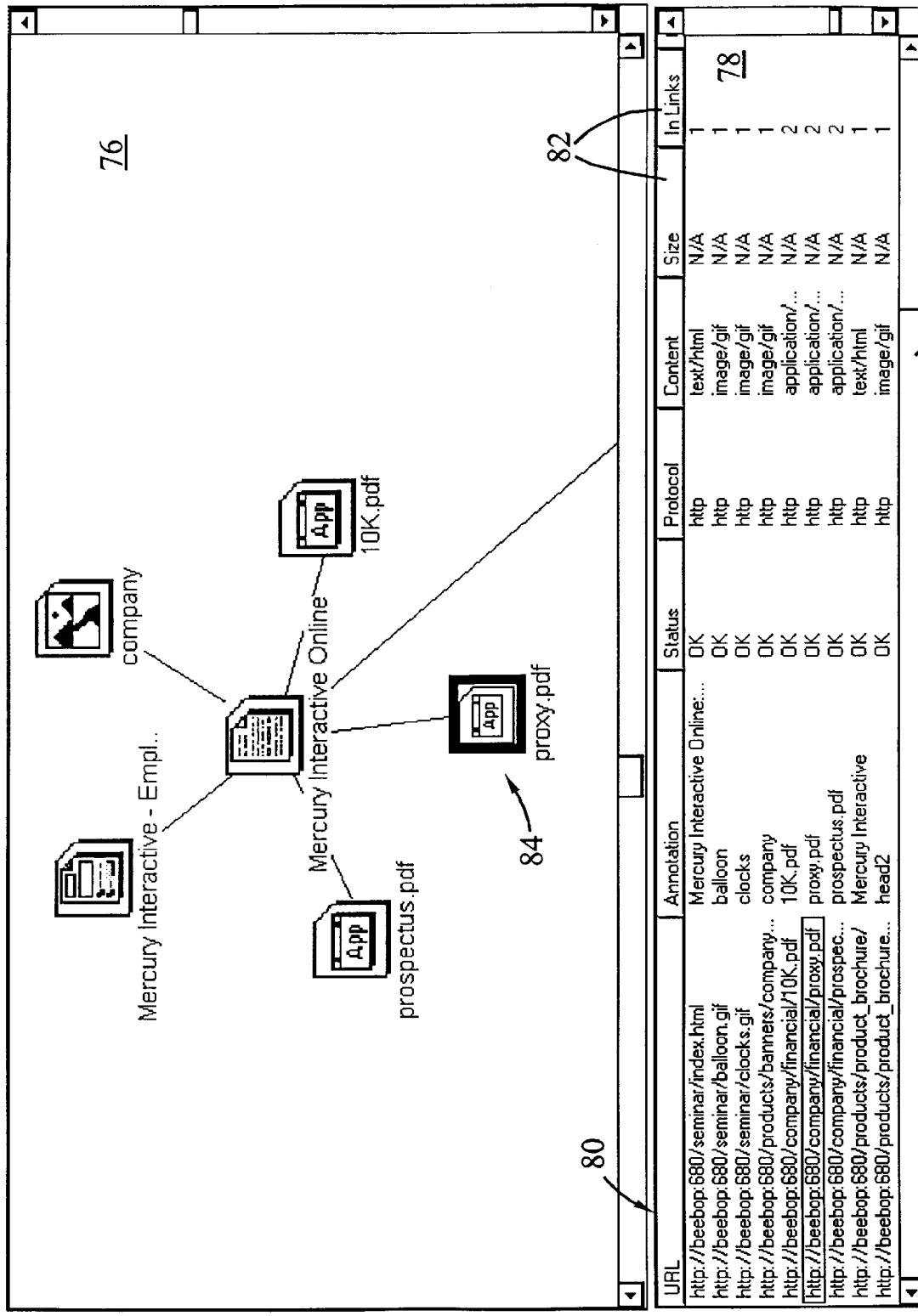
FIG. 4 is a screen display which illustrates a split-screen display mode, wherein a graphical representation of a Web site is displayed in an upper window and a textual representation of the Web site is displayed in a lower window.
Figure 18:
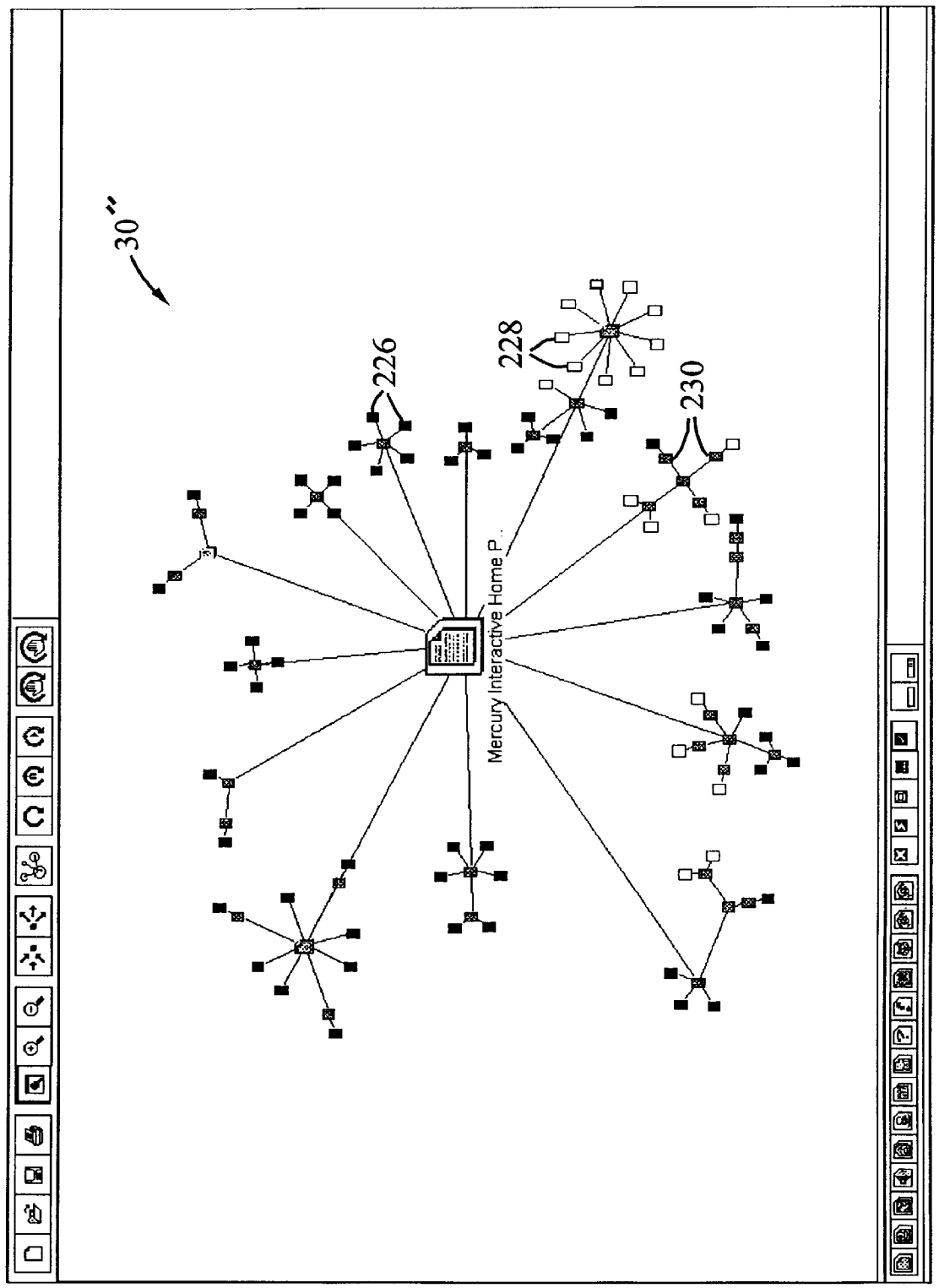
FIG. 18 illustrates the filtered map of FIG. 16 redisplayed in Astra's Visual Web Display™ format.

As generally illustrated by FIGS. 3 and 4, different icons are used to represent the different URL types when the nodes are viewed in a sufficiently zoomed-in mode. (Generic icons of the type best illustrated by FIG. 18 are used to display nodes that fall below a predetermined size threshold.) As described below, special icons and visual representations are also used to indicate status information with respect to the URLs. For example, special icons are used to depict, respectively, inaccessible URLs, URLs which are missing, URLs for which access was denied by the server, and URLs which have been detected but have not been scanned. (The term "scan" refers generally to the process of sending informational requests to server components of a computer network, and in the context of the preferred embodiment, refers to the process of sending requests to Web server components to obtain Web site content associated with specific URLs.)

The lines which interconnect the nodes (URL icons) in FIGS. 1–3 (and the subsequent figures with screen displays) represent links between URLs. As is well understood in the art, the functions performed by these links vary according to URL type. For example, a link from one HTML document to another HTML document normally represents a hyperlink which allows the user to jump from one document to the other while navigating the Web site with a browser. In FIG. 1, an example of a hyperlink which links the home page URL (shown at the center of the map) to another HTML page (displayed to the right of the home page) is denoted by reference number 32. (As generally illustrated in FIG. 1 and the other figures which illustrate screen displays, regular HTML documents are displayed by Astra as a shaded document having text thereon.) A link between an HTML document and a GIF file, such as link 36 in FIG. 3, normally represents a graphic which is embedded within the Web page.

Maps of the type illustrated in FIG. 1 are generated by Astra using an HTTP-level scanning process (described below) which involves the reading and parsing the Web site's HTML pages to identify the architecture (i.e., the arrangement of URLs and links) of the Web site, and to obtain various status information (described below) about the Web site's URLs. The basic scanning process used for this purpose is generally similar to the scanning process used by conventional Webcrawlers. As part of Astra's Dynamic Scan feature, Astra additionally implements a special dynamic page scanning process which permits dynamically-generated Web pages to be scanned and included in the Web site map. As described below, this process involves capturing the output of a Web browser when the user submits an HTML-embedded form (such as when the user submits a database query), and then reusing the captured dataset during the scanning process to recreate the form submission and append the results to the map.

Table 1 lists the predefined icons that are used by Astra to graphically represent different URL types within site maps. As illustrated, the URL icons generally fall into two categories: object-type ("URL type") icons and status icons. The object-type icons are used to indicate the content or service type of URLs that have been successfully scanned. The status icons are used to indicate the scanning status (not found, access denied, etc.) of URLs for which either (i) scanning has not been performed, or (i) scanning was unsuccessful. Various examples of these two types of icons are included in the figures.

TABLE 1

| URL Type | Scanning Status |
| --- | --- |
| HTML | Not found |
| HTML with Form | Not Scanned |
| Image | Inaccessible |
| Sound | Access Denied |
| Application | |
| Text | |
| Unknown | |

TABLE 1-continued

| URL Type | Scanning Status |
| --- | --- |
| Video | |
| Gopher | |
| FTP | |
| Dynamic Page | |

Once the map has been generated, the user can interactively navigate the map using various navigation tools of the Astra GUI, such as the zoom-in and zoom-out buttons 34, 36 (FIG. 1) and the scrolling controls 40, 42 (FIGS. 2 and 3). To zoom-in on a particular region of the map 30, the user can click on the zoom-in button 34 and then use the mouse to draw a box around the map region of interest; Astra will then re-size the highlighted region to generally fit the display screen. As will be recognized by those skilled in the art, the ability to zoom in and out between high level, perspective views which reveal the overall architecture of the site, and magnified (zoomed-in) sub-views which reveal URL-specific information about the Web site, greatly facilitates the task of navigating and monitoring Web site content.

As generally illustrated by FIG. 3, the annotations (page titles, filenames, etc.) of the URLs begin to appear (below the associated icons) as the user continues to zoom in. As further illustrated by FIG. 3, the URL (address) of a node is displayed when the mouse cursor is positioned over the corresponding icon.

While navigating the map, the user can retrieve a URL (content object) from the server by double-clicking on the corresponding URL icon; this causes Astra to launch the client computer's default Web browser (if not already running), which in-turn retrieves the URL from the Web server. For example, the user can double-click on the URL icon for an HTML document (using the left mouse button) to retrieve and view the corresponding Web page. When the user clicks on a URL icon using the right mouse button, a menu appears which allows the user to perform a variety of actions with respect to the URL, including viewing the URL's properties, and launching an HTML editor to retrieve and edit the URL. With reference to FIG. 3, for example, the user can click on node 44 (using the right mouse button), and can then launch an HTML editor to edit the HTML document and delete the reference to missing URL 45. (As illustrated by FIG. 3, missing URLs are represented within Astra maps by a question mark icon.)

One important feature of Astra, referred to herein as "Automatic Update," allows the user to update an existing Web site map to reflect any changes that have been made to the map since a prior mapping of the site. To initiate this feature, the user selects a "start Automatic Update" button 37 (FIG. 1), or selects the corresponding menu item, while viewing a site map. This initiates a re-scanning process in which Astra scans the URLs of the Web site and updates the map data structure to reflect the current architecture of the site. As part of this process, Astra implements a caching protocol which eliminates the need to download URLs and URL headers that have not been modified since the most recent mapping. (This protocol is described below under the heading "SCANNING PROCESS.") This typically allows the map to be updated in a much shorter period of time than is required to perform the original mapping. This feature is particularly useful for Webmasters of complex Web sites that have rapidly changing content.

III. Map Layout and Display Methodology (FIGS. 1–3, 23 and 24)

An important aspect of the invention is the methodology used by Astra for presenting the user with a graphical, navigable representation of the Web site. This feature of Astra, which is referred to as Visual Web Display (abbreviated as "VWD" herein), allows the user to view and navigate complex Web structures while visualizing the interrelationships between the data entities of such structures. The method used by Astra to generate VWD site maps is referred to herein as the "Solar Layout method," and is described at the end of this section.

One aspect of the VWD format is the manner in which children nodes ("children") are displayed relative to their respective parent nodes ("parents"). (In the context of the preferred embodiment, the term "node" refers generally to a URL icon as displayed within the site map.) As illustrated by the collection of nodes shown in FIG. 3, the parent 44 is displayed in the center of the cluster, and the seven children 48 are positioned around the parent 44 over an angular range of 360 degrees. One benefit of this layout pattern is that it allows collections of related nodes to be grouped together on the screen in relatively close proximity to one another, making it easy for the user identify the parent-child relationships of the nodes. This is in contrast to the expandable folder type representations used by Webmapper™. the Windows® 95 Explorer, and other Windows® applications, in which it is common for a child to be separated from its parent folder by a long list of other children.

In this FIG. 3 example, all of the children 48 are leaf nodes (i.e., nodes which do not themselves have children). As a result, all of the children 48 are positioned approximately equidistant from the parent 44, and are spaced apart from one another by substantially equal angular increments. Similar graphical representations to that of FIG. 3 are illustrated in FIG. 1 by node clusters 52, 54 and 56. As illustrated by these three clusters in FIG. 1, both (i) the size of parent icon and (ii) the distance from the parent to its children are proportional to the number of immediate children of the parent. Thus, for example, cluster 56 has a larger diameter (and a larger parent icon) than clusters 52 and 54. This has the desirable effect of emphasizing the pages of the Web site that have the largest numbers of outgoing links. (As used herein, the term "outgoing links" includes links to GIF files and other embedded components of document.)

As best illustrated by cluster 64 in FIG. 2, of which node 65 is the primary parent or "root" node, children which have two or more of their own children (i.e., grandchildren of the root) are positioned at a greater distance from the root node 65 than the leaf nodes of the cluster, with this distance being generally proportional to the size of the sub-cluster of which the child is the parent. For example, node 66 (which has 3 children) is positioned farther from the cluster's root node 65 than leaf nodes 70; and the parent of cluster 60 is positioned farther from the root node 65 than node 66. As illustrated in FIG. 1, this layout principal is advantageously applied to all of the nodes of the Web site that have children. The recursive method (referred to as "Solar Layout") used by Astra to implement these layout and display principles is described below.

Another aspect of the layout method is that the largest "satellite" cluster of a parent node is centered generally opposite from (along the same line as) the incoming link to the parent node. This is illustrated, for example, by cluster 54 in FIG. 1 and by cluster 60 in FIG. 2, both of which are positioned along the same line as their respective parents. This aspect of the layout arrangement tends to facilitate visualization by the user of the overall architecture of the site.

As will be apparent from an observation of FIG. 1, the graphical map produced by the application of the above layout and display principles has a layout which resembles the general arrangement of a solar system, with the home page positioned as the sun, the children of the home page being in orbit around the sun, the grandchildren of the home page being in orbit around their immediate respective parents, and so on. One benefit of this mapping arrangement is that it is well suited for displaying the entire site map of a complex Web site on a single display screen (as illustrated in FIG. 1). Another benefit is that it provides an intuitive structure for navigating the URLs of a complex Web site. While this mapping methodology is particularly useful for the mapping of Web sites, the methodology can also be applied, with the realization of similar benefits, to the mapping of other types of databases. For example, the VWD methodology can be used to facilitate the viewing and navigation of a conventional PC file system.

Another benefit of this site map layout and display methodology is that the resulting display structure is well suited for the overlaying of information on the map. Astra takes full advantage of this benefit by providing a set of API functions which allow other applications (Astra plug-ins) to manipulate and add their respective display data to the site map. An example of an Astra plug-in which utilizes this feature is the Action Tracker™ tool, which superimposes user activity data onto the site map based on analyses of server access log files. The Astra plug-in API and the Action Tracker plug-in are described in detail below.

As illustrated in FIG. 1, all of the nodes of the site map (with the exception of the home page node) are displayed as having a single incoming link, even though some of the URLs of the depicted Web site actually have multiple incoming links. Stated differently, the Web site is depicted in the site map 30 as though the URLs are arranged within a tree data structure (with the home page as the main root), even though a tree data structure is not actually used. This simplification to the Web site architecture is made by extracting a span tree from the actual Web site architecture prior to the application of a recursive layout algorithm, and then displaying only those links which are part of the spanning tree. (In applications in which the database being mapped is already arranged within a tree directory structure, this step can be omitted.) As a result, each URL of the Web site is displayed exactly once in the site map. Thus, for example, even though a particular GIF file may be embedded within many different pages of the Web site, the GIF file will appear only once within the map. This simplification to the Web site architecture for mapping purposes makes it practical and feasible to graphically map, navigate and analyze complex Web sites in the manner described above.

Figure 6:
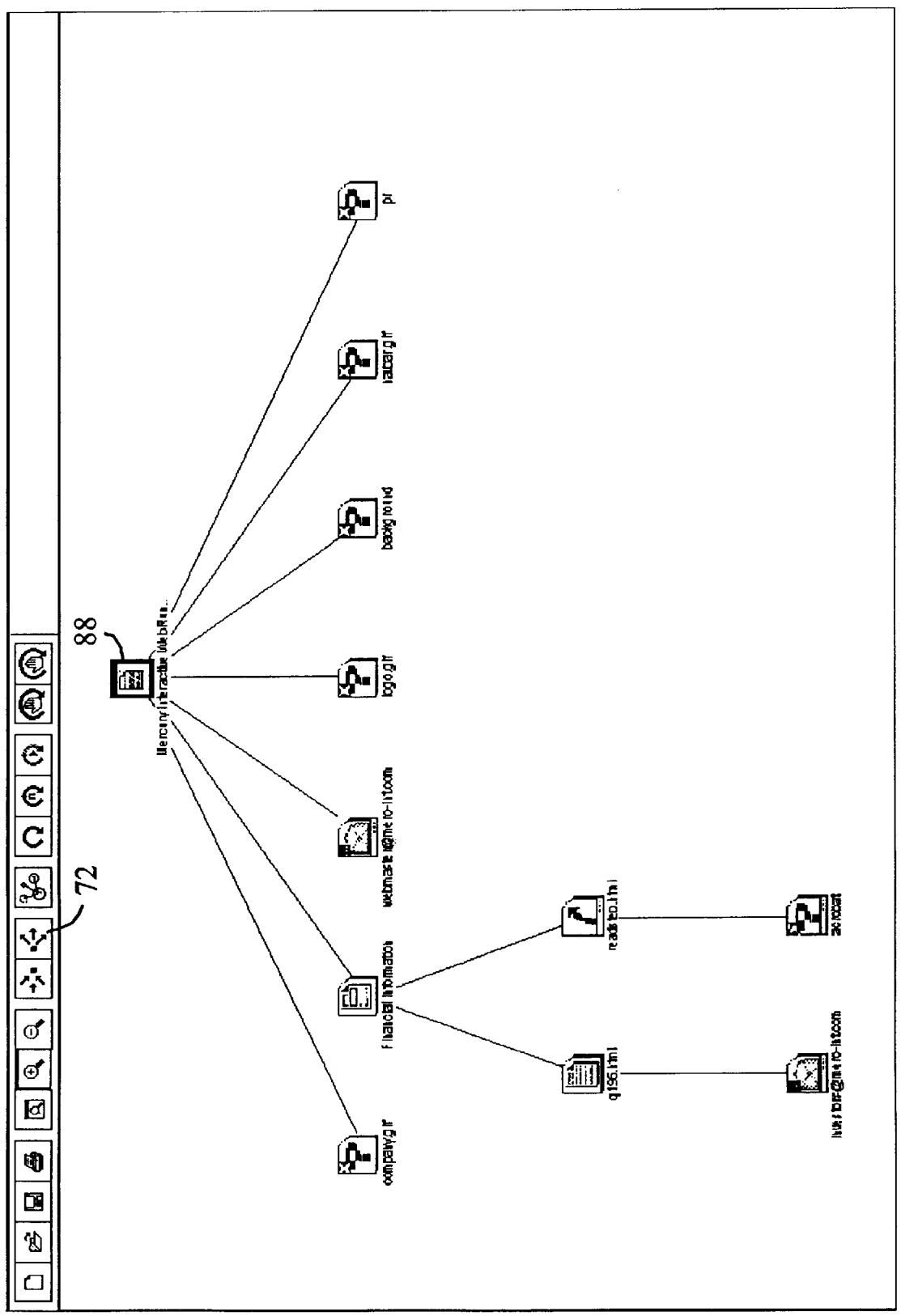
FIG. 6 is a screen display illustrating a feature which allows a user to selectively view the outbound links of URL in a hierarchical display format.
Figure 22:
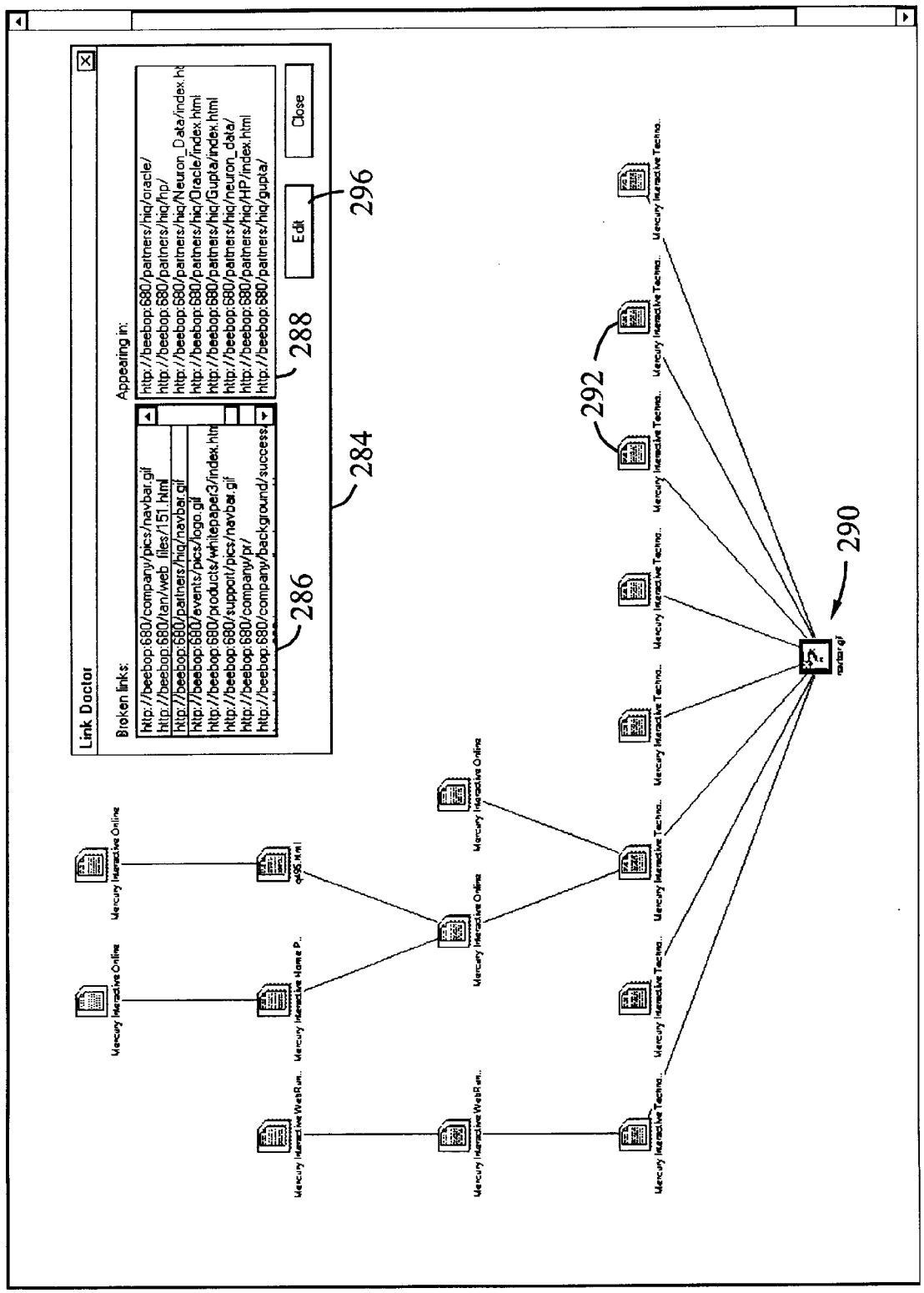
FIG. 22 is a screen display which illustrates a link repair feature of Astra.

Because the Visual Web Display format does not show all of the links of the Web site, Astra supports two additional display formats which enable the user to display, respectively, all of the incoming links and all of the outgoing links of a selected node. To display all of the outgoing links of a given node, the user selects the node with the mouse and then selects the "display outgoing links" button 72 (FIG. 1) from the tool bar 46. Astra then displays a hierarchical view (in the general form of a tree) of the selected node and its outgoing links, as illustrated by FIG. 6. Similarly, to display the incoming links of a node, the user selects the node and then clicks on the "display incoming links" button 71. (A screen display illustrating the incoming links format is shown in FIG. 22.) To restore the Visual Web Display view, the user clicks on the VWD button 73.

The Solar Layout method (used to generate VWD-format site maps) generally consists of three steps, the second two of which are performed recursively on a node-by-node basis.

These three steps are outlined below, together with associated pseudocode representations. In addition, a source code listing of the method (in C++) is included in the mocrofiche appendix as Appendix A.

Step 1—Select Span Tree

In this step, a span tree is extracted from the graph data structure which represents the arrangement of nodes and links of the Web site. (The graph data structure is implemented as a "Site Graph" OLE object, as described below.) Any standard span tree algorithm can be used for this purpose. In the preferred embodiment, a shortest-path span tree algorithm known as "Dijkstra's algorithm" is used, as implemented within the commercially-available LEDA (Library of Efficient Data types and Algorithms) software package. As applied within Astra, this algorithm finds the shortest paths from a main root node (corresponding to the Web site's home page or some other user-specified starting point) to all other nodes of the graph structure. The result of this step is a tree data structure which includes all of the URLs of the graph data structure with the home page represented as the main root of the tree. For examples of other span tree algorithms which can be used, see Alfred V. Aho et al, *Data Structures and Algorithms*, Addison-Wesley, 1982.)

Step 2—Solar Plan

This is a recursive step which is applied on a node-by-node basis in order to determine (i) the display size of each node, (ii) the angular spacings for positioning the children nodes around their respective parents, and (iii) the distances for spacing the children from their respective parents. For each parent node, the respective sizes of the parent's satellites are initially determined. (A "satellite" is any child of the parent plus the child's descendants, if any.) The satellite sizes are then used to allocate (a) angular spacings for positioning the satellites around the parent, and (b) the radial distances between the satellites and the parent. This process is repeated for each parent node (starting with the lower level parent nodes and working up toward the home page) until all nodes of the graph have been processed. The following is a pseudocode representation of this process:

```
Node::SolarPlan( )
{
IF node has no children
     return basic graphical dimension for a single node
ELSE
     For each linked node as selected in the span tree, call SolarPlan( )
     recursively;
     Based on the sum of the sizes of the satellites, allocate angle for
     positioning satellites around parent, and set satellite distances from
     parent;
     Calculate size of present cluster (parent plus satellites).
}
```

A modified Solar Plan process which incorporates two additional layout features is described below and illustrated by FIGS. 23 and 24,

Step 3—Solar Place

This step recursively positions the nodes on the display screen, and is implemented after Step 2 has been applied to all of the nodes of the graph. The sequence starts by positioning the home page at the center, and then uses the angle and distance settings calculated in Step 2 to position the children of the home page around the home page. This process is repeated recursively for each parent node until all of the nodes have been positioned on the screen.

```
Node::SolarPlace(x, y, entry_angle)
{
Move this node to location (x,y)
For each satellite:
     calculate final angle as the sum of the entry_angle and the angle
     allocated in Step 2; Calculate satellite center (x and y coordinates)
     based on new angle and distance from current node; Call SolarPlace
     using the above-calculated angle and location.
}
```

In the above pseudocode representation, the "x" and "y" parameters specify the screen position for the placement of a node (icon), and the "entry_angle" parameter specifies the angle of the line (link) between the node and its respective parent. In the preferred embodiment, the method is implemented such that the largest satellite of a parent node is positioned using the same entry angle as the parent node, so that the satellite center, parent node, and parent of the parent node all fall generally along the same line. (The determination of the largest satellite is performed in Step 2.) As indicated above, this aspect of the layout method is illustrated in FIG. 1 by cluster (satellite) 54, which is positioned along the same line as both its immediate parent icon and the home page icon.

A modified Solar Plan process will now be described with reference to the screen displays of FIGS. 23 and 24, and to the corresponding pseudocode representation below. This modified process incorporates two additional layout features which relate to the positioning of the satellites around a parent. These layout features are implemented within the source code listing (Appendix A), and are represented generally by the highlighted text of the following pseudocode sequence:

```
Node::SolarPlan( )
{
IF node has no children
     return basic graphical dimension for a single node
ELSE
     For each linked node as selected in the span tree, call SolarPlan( )
```

-continued

```
    recursively;
    Based on the sum of the sizes of the satellites + minimal weight of the
    incoming link, allocate angle for positioning satellites around parent,
    and set satellite distances from parent;
    Sort satellite list as follows: smallest child first, and in jumps of two
    next child up to the biggest, and then back to second biggest and in
    jumps of two down to smallest (e.g., 1, 3, 5 . . . biggest, second biggest,
    . . . 6, 4, 2);
    Calculate size of present cluster (parent plus satellites).
}
```

Figure 23:
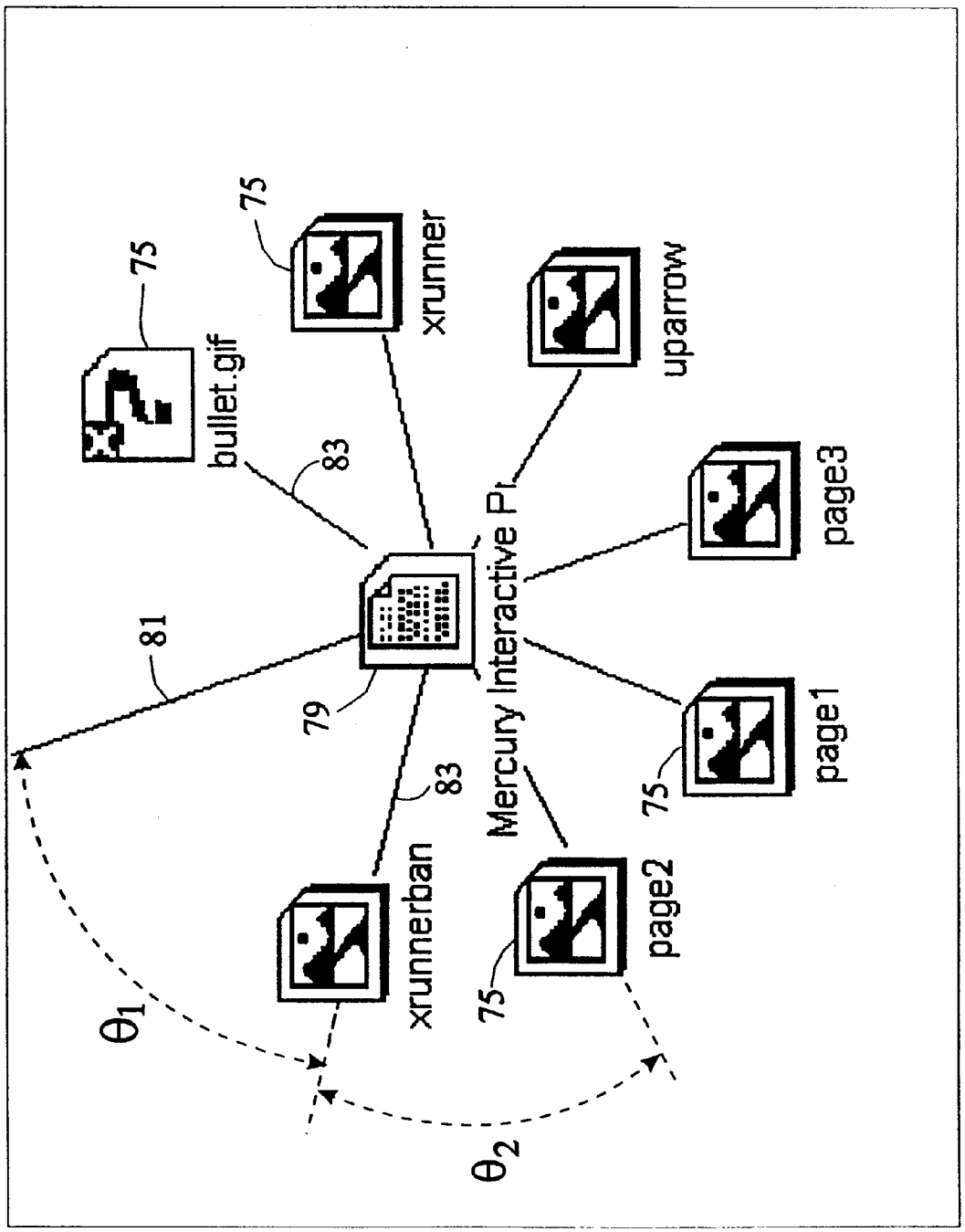
FIGS. 23 and 24 are partial screen displays which illustrate layout features in accordance with another embodiment of the invention.
Figure 24:
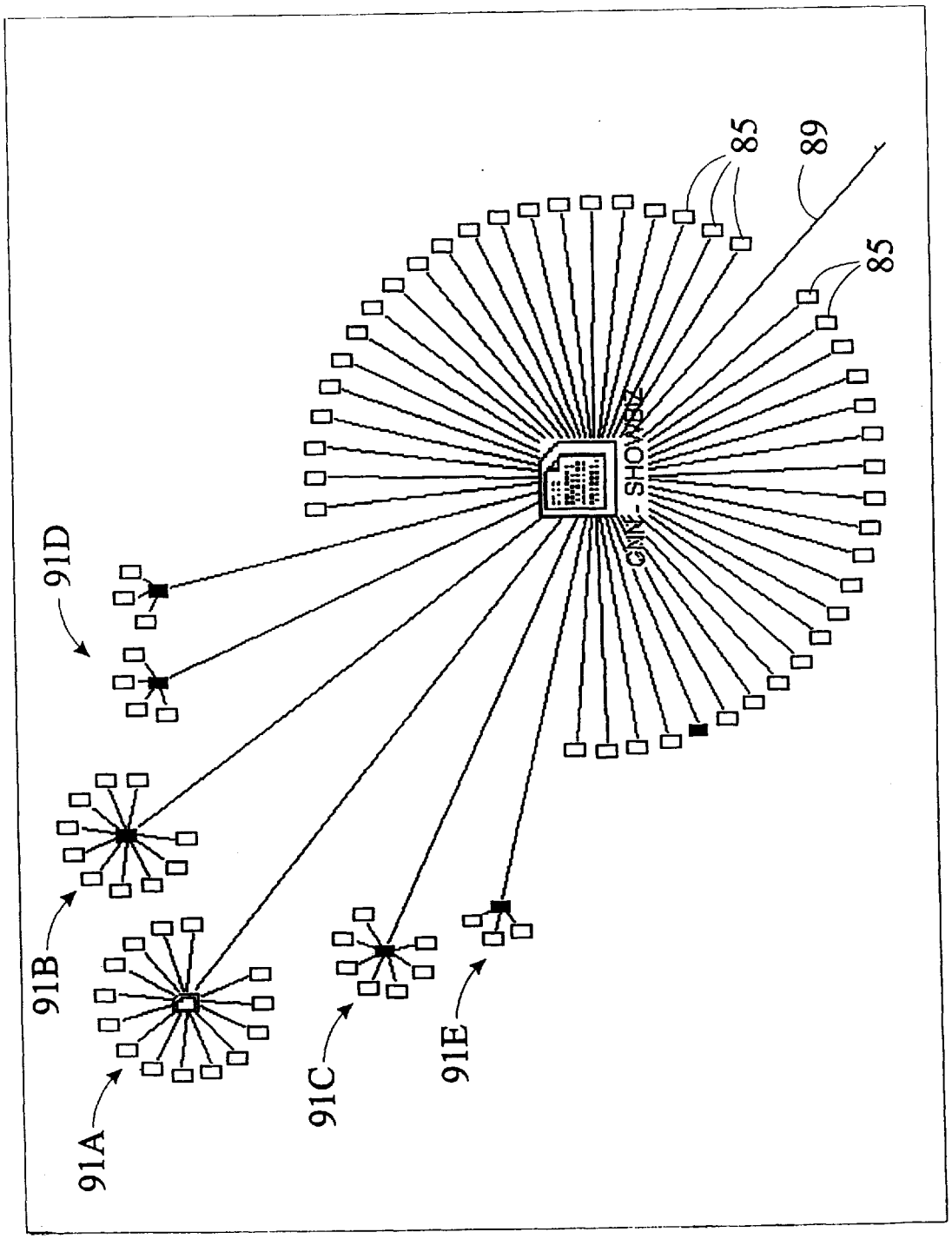

The first of the two layout features is illustrated by FIG. 23, which is a partial screen display (together with associated annotations) of a parent-child cluster comprising a parent 79 and seven children or satellites 75. This layout feature involves allocating an angular interval (e.g., 20 degrees) to the incoming link 81 to the parent 79, and then angularly spacing the satellites 75 (which in this example are all leaf nodes) over the remaining angular range. In the preferred embodiment, this is accomplished by assigning a minimal weight (corresponding to the angular interval) to the incoming link 81, and then treating this link 81 as one of the outgoing links 83 when assigning angular positions to the satellites 75. As a result of this step, the satellites 75 are positioned around the parent 79 over an angular range of less than 360 degrees—in contrast to the clusters of FIGS. 1–5, in which the satellites are positioned over the full 360 range. (In this FIG. 23 example, because all of the satellites 75 are leaf nodes, the satellites 75 are positioned equidistant from the parent 79 with equal angular spacings.) One benefit of this added step is that it allows the user to more easily distinguish the incoming link 81 to a parent 79 from the outgoing links 83 from the parent. With reference to the angular notations of FIG. 23, the minimal weight is preferably selected such that the angle $\theta_1$ between the incoming link 81 and each of the two adjacent parent-child links 83 is greater than or equal to the minimum angle $\theta_2$ between adjacent parent-child links 83 for the given cluster. This layout feature is also illustrated by FIG. 24.

The second of the two additional layout features involves ordering the satellites around the parent based on the respective sizes of the satellites. This feature comes into play when a parent node has multiple satellites that differ in size from one another. The layout arrangement which is produced by this feature is generally illustrated by FIG. 24, which shows a cluster having a parent node (labeled "CNN SHOWBIZ") and 49 satellites. As illustrated by this screen image, the satellites are ordered such that the smallest satellites 85 are angularly positioned closest to the incoming link 89 to the parent, and such that the largest satellites 91A–E are positioned generally opposite from the incoming link 89. This is preferably accomplished by sorting the satellites using the sorting algorithm of the above pseudocode sequence (which produces a sorted satellite list in which the satellites progress upward from smallest to largest, and then progress downward from second largest to second smallest), and then positioning the satellites around the parent (starting at the incoming link 89) in the order which results from the sorting process. In this example, the largest satellite 91A is positioned opposite the incoming link 89; the second and third largest satellites 91B and 91C are positioned adjacent to the largest satellite 91A; the fourth and fifth largest satellites 91D and 91E are positioned adjacent to the second and third largest satellites 91B and 91C (respectively); and so on. As is apparent from FIG. 24, this layout feature tends to produce a highly symmetrical layout.

Other aspects of the Solar Layout method will be apparent from an observation of the screen displays and from the source code listing of Appendix A.

IV. Astra Graphical User Interface (FIGS. 1 and 4–6)

As illustrated in FIG. 1, the Astra menu bar includes seven menu headings: FILE, VIEW, SCAN, MAP, URL, TOOLS and HELP. From the FILE menu the user can perform various file-related operations, such as save a map file to disk or open a previously generated map file. From the VIEW menu the user can select various display options of the Astra GUI. From the SCAN menu the user can control various scanning-related activities, such as initiate or pause the automatic updating of a map, or initiate a dynamic page scan session. From the MAP menu, the user can manipulate the display of the map, by, for example, collapsing (hiding) all leaf nodes, or selecting the Visual Web Display mode. From the URL menu, the user can perform operations with respect to user-selected URLs, such as display the URL's content with a browser, invoke an editor to modify the URL's content, and display the incoming or outgoing links to/from the URL.

From the TOOLS menu the user can invoke various analysis and management related tools. For example, the user can invoke a map comparison tool which generates a graphical comparison between two maps. This tool is particularly useful for allowing the user to readily identify any changes that have been made to a Web site's content since a previous mapping. The user can also invoke the Action Tracker tool, which superimposes link activity data on the Web site map to allow the user to readily ascertain the links and URLs that have the most hits. (The Action Tracker tool is described in detail below under the heading "TRACKING AND DISPLAY OF VISITOR ACTIVITY.") The user can also invoke a Link Doctor tool which facilitates the repairing of broken links. These and other tools of Astra are described in the subsequent sections.

With further reference to FIG. 1, the Astra GUI includes a tool bar 46 and a filter bar 47, both of which can be selectively displayed as needed. The tool bar 46 includes buttons for initiating commonly-performed operations. From left to right in FIG. 1, these functions are as follows: (a) start generation of new map, (b) open map file, (c) save map to disk, (d) print, (e) size map to fit within window, (f) zoom in, (g) zoom out, (h) display incoming links of selected node; (i) display outgoing links of selected node, j) display map in Visual Web Display format, (k) initiate Automatic Update, (l) pause Automatic Update, (m) resume Automatic Update, (n) initiate Dynamic Scan, and (o) stop Dynamic Scan. (The function performed by each button is indicated textually when the mouse cursor is positioned over the respective button.)

Figure 16:
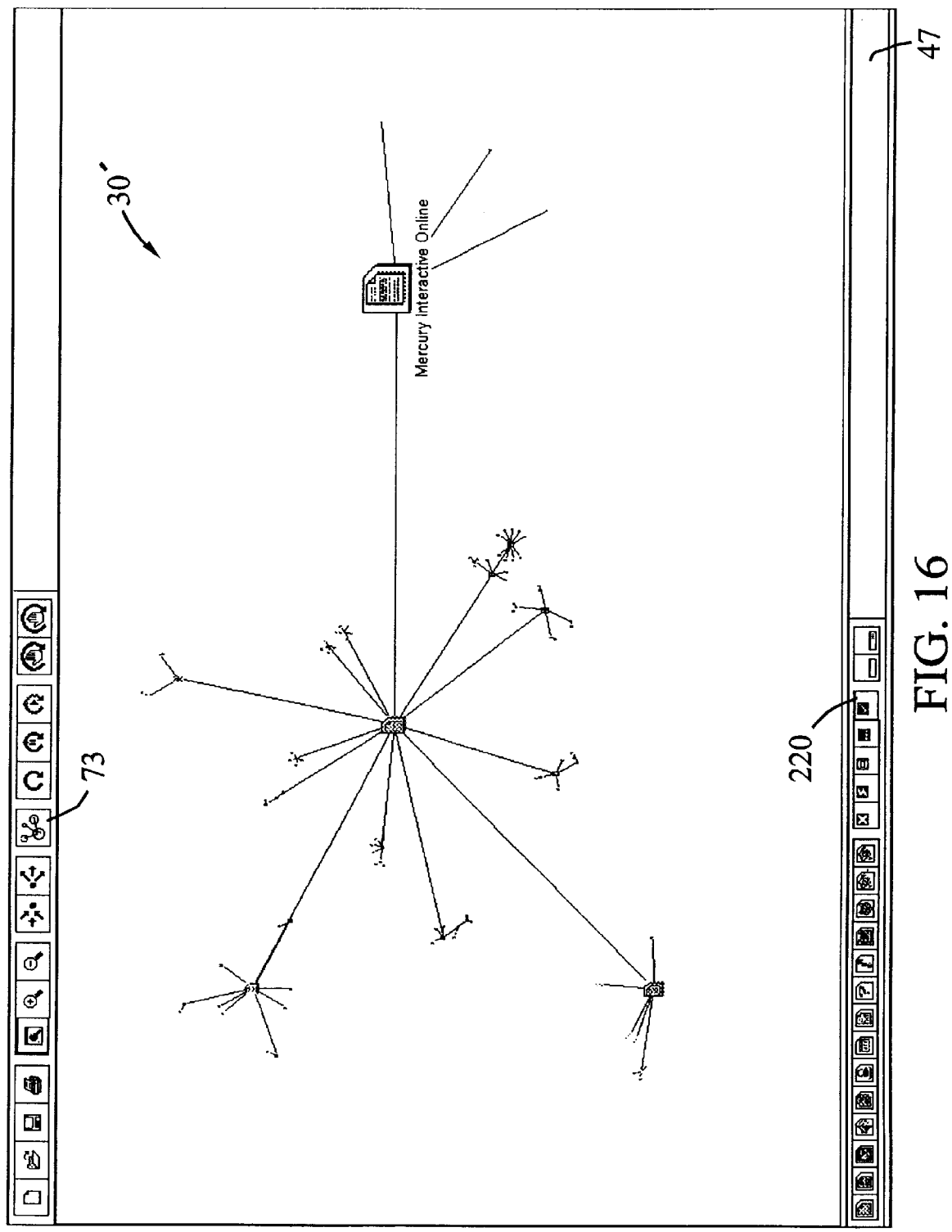
FIG. 16 is a screen display which illustrates the site map of FIG. 1 following the application of a filter which filters out all URLs (and associated links) having a status other than "OK."

The filter bar 47 includes a variety of different filter buttons for filtering the content of site maps. When the user clicks on a filter button, Astra automatically hides all links and pages of a particular type or status, as illustrated in FIG. 16 and discussed below. The filter buttons are generally divided into three groups: content/service filters 49, status filters 50, and location filters 51. From left to right in FIG. 1, the content/service filters 49 filter out URLs of the following content or service types: (a) HTML, (b) HTML forms, (c) images, (d) audio, (e) CGI, (f) Java, (g) other applications, (h) plain text, (i) unknown, (j) redirect, (k) video, (l) Gopher, (m) FTP, and (n) all other Internet services. The status filters 50 filter out URLs of the following statuses (from left to right): (a) not found, (b) inaccessible (e.g., no response from server), (c) access denied, (d) not scanned, and (e) OK. The left-hand and right-hand location filters 51 filter out local URLs and external URLs, respectively, based on the domain names of the URLs. Multiple filters can be applied concurrently.

FIG. 4 illustrates a split-screen mode which allows the user to view a graphical representation of the Web site in an upper window 76 while viewing a corresponding textual representation (referred to as "List View") in a lower window 78. To expose the List View window 78, the user drags and drops the separation bar 80 to the desired position on the screen. Each line of text displayed in the List View window 78 represents one node of the site map, and includes various information about the node. For each node, this information includes: the URL (i.e., address), an annotation, the scanning status (OK, not found, inaccessible, etc.), the associated communications protocol (HTTP, mailto, FTP, etc.), the content type, the file size (known only if the entire file has been retrieved), the numbers of inbound links and outbound links, and the date and time of last modification. (The outbound link and last modification information can be exposed in the FIG. 4 screen display by dragging the horizontal scrolling control 77 to the right.)

As described below, this information about the nodes is obtained by Astra during the scanning process, and is stored in the same data structure 114 (FIG. 9) that is used to build the map. As additionally described below, whenever the user initiates an Automatic Update, Astra uses the date/time of last modification information stored locally in association with each previously-mapped HTML document to determine whether the document needs to be retrieved and parsed. (The parsing process is used to identify links to other URLs, and to identify other HTML elements relevant to the mapping process.) As indicated above, this provides the significant advantage of allowing the Web site to be re-mapped without having to repeat the entire scanning/parsing process.

With further reference to FIG. 4, whenever the user selects a node in the upper window 76, the corresponding line in the List View window 78 is automatically highlighted. (As illustrated by node 84 in FIG. 4, Astra graphically represents the selection of a node by outlining the node's icon in black.) Likewise, whenever the user selects a line in the List View window 78, the corresponding node is automatically highlighted in the upper window 76. This feature allows the user to rapidly and efficiently associate each textual line with its graphical counterpart, and vice versa. In addition, by clicking on the headers 82 of the separation bar 80, the user can view the listed URLs in a sorted order. For example, if the user clicks on the "in links" header, Astra will automatically sort the list of URLs according to the number of incoming links, and then display the sorted listing in the List View window 78.

Figure 5:
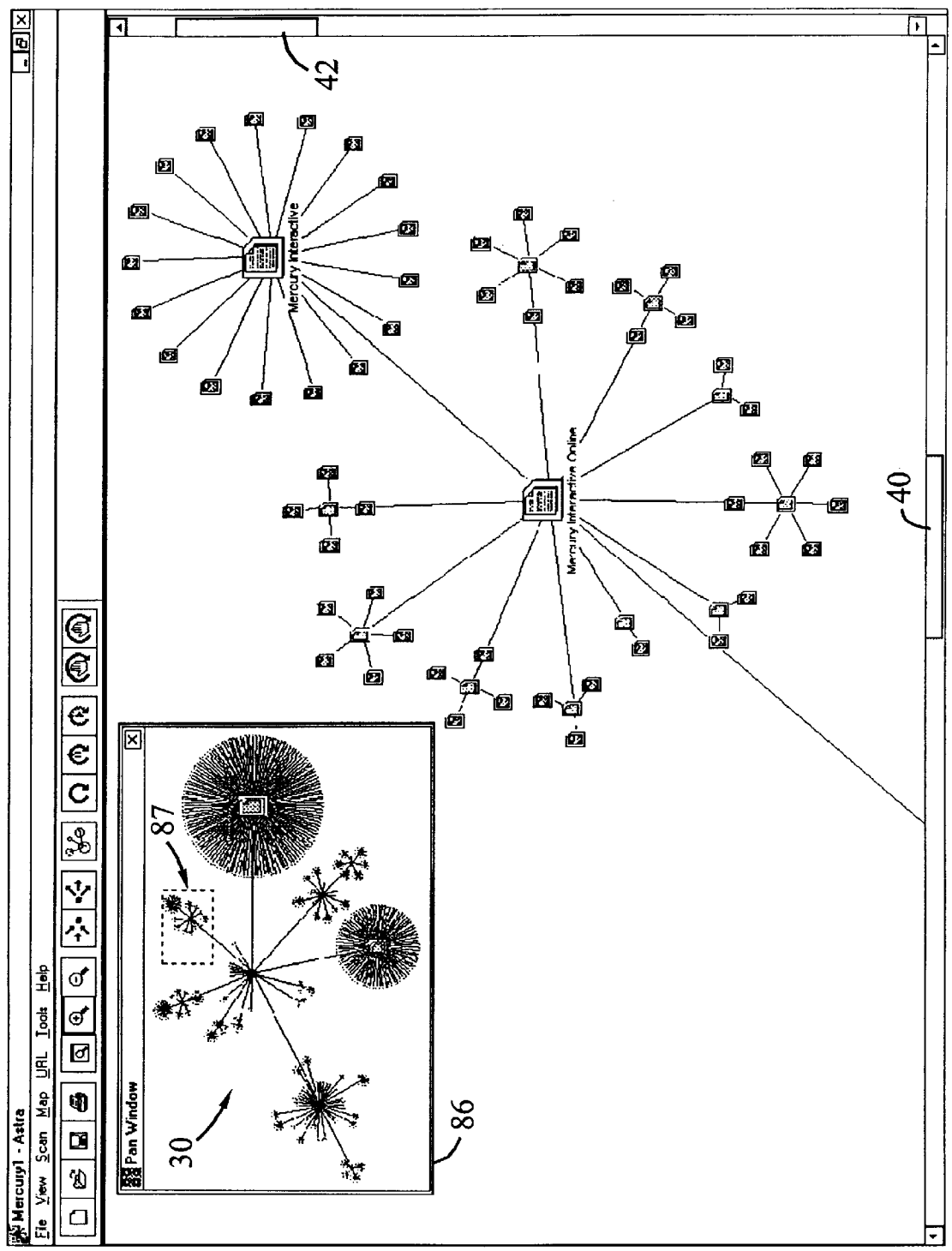
FIG. 5 is a screen display which illustrates a navigational aid of the Astra graphical user interface.

FIG. 5 illustrates a Pan Window feature of Astra. This feature facilitates navigation of the site map while in a zoomed-in mode by presenting the user with a perspective view of the navigational position within the map. To display the Pan Window 86, the user selects the "Pan Window" menu option from the VIEW menu while viewing a map. Within the Pan Window, the user is presented with a display of the entire map 30, with a dashed box 87 indicating the portion of the map that corresponds to the zoomed-in screen display. As the user navigates the site map (using the scrolling controls 40, 42 and/or other navigational controls), the dashed box automatically moves along the map to track the zoomed-in screen display. The user can also scroll through the map by simply dragging the dashed box 87 with the mouse. In the preferred embodiment, the Pan Window feature is implemented in-part using a commercially-available from Stingray™ Corporation called SEC++, which is designed to facilitate the zoomed-in viewing of a general purpose graphic image.

FIG. 6 illustrates the general display format used by Astra for displaying the outgoing links of a selected node 88. To display a node's outgoing links, the user selects the node with the mouse and then clicks on the "show outgoing links" button 72 on the tool bar. As illustrated, Astra then displays all outgoing links from the node (including any links that do not appear in the VWD site map), and displays additional levels of outgoing links (if any) which emanate from the children of the selected node. The display format used for this purpose is in the general format of a tree, with the selected node displayed as the root of the tree. An analogous display format (illustrated in FIG. 22) is used for displaying the incoming links to a node.

V. Astra Software Architecture (FIGS. 7 and 8)

Figure 7:
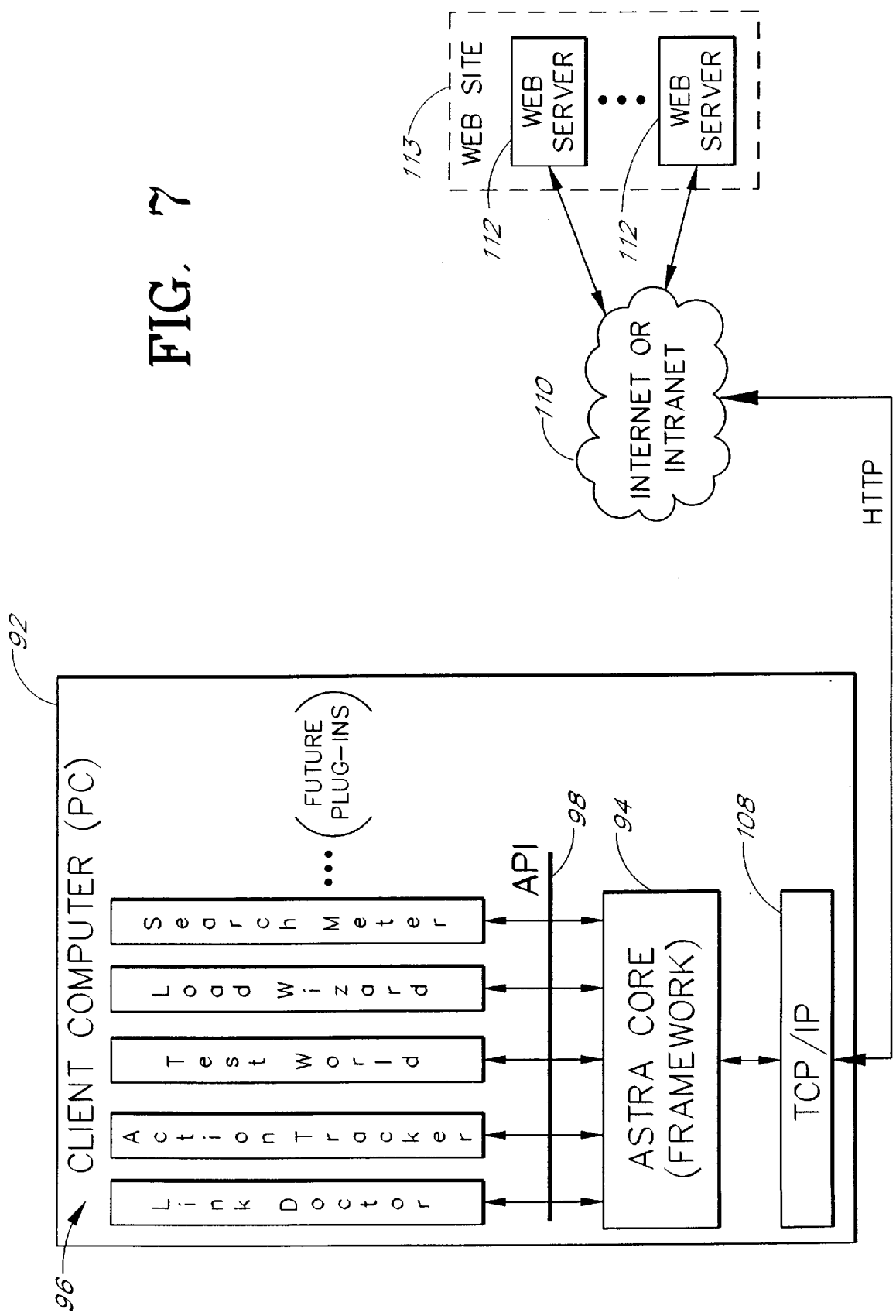
FIG. 7 is a block diagram which illustrates the general architecture of Astra, which is shown in the context of a client computer communicating with a Web site.
Figure 8:
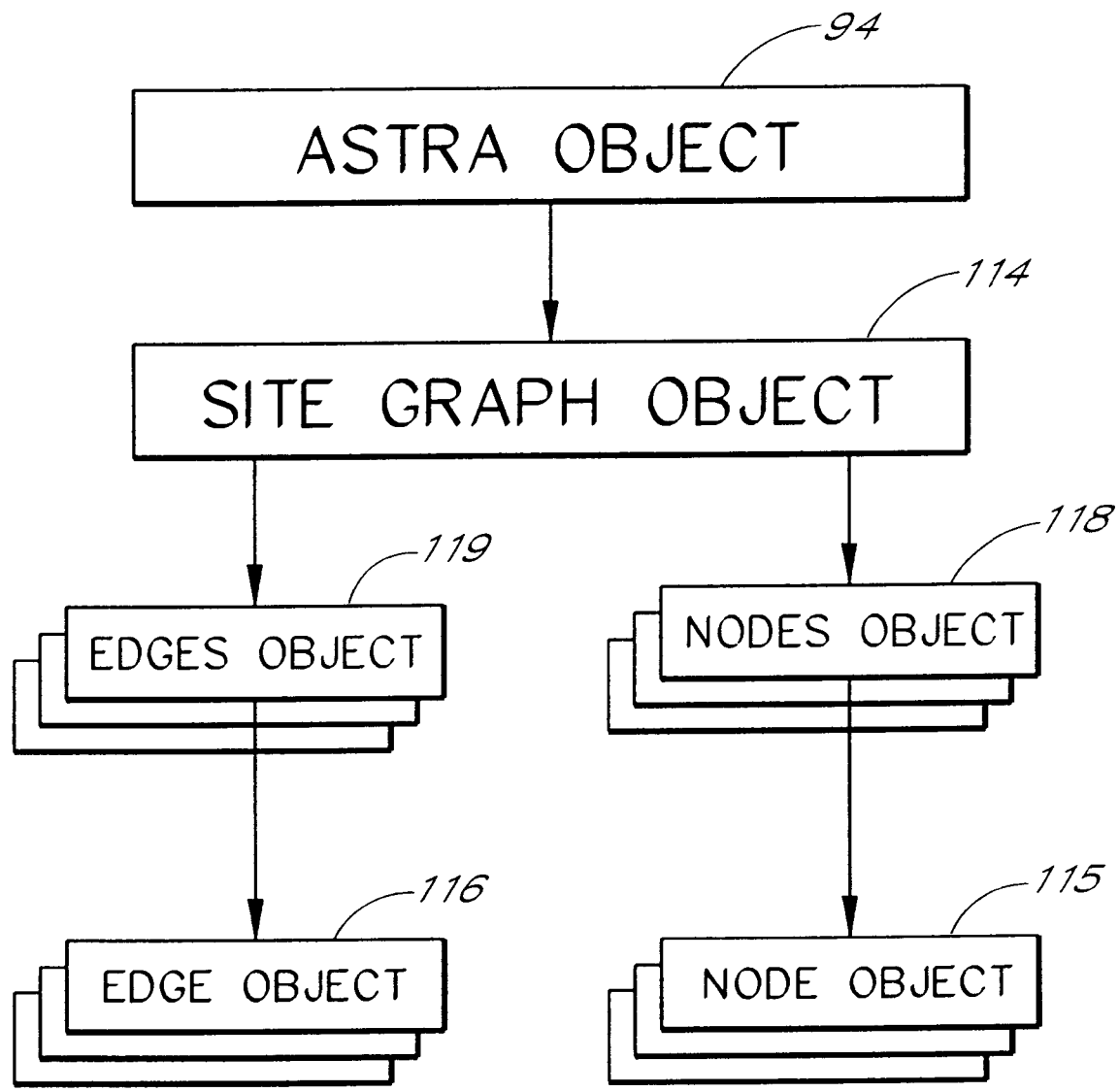
FIG. 8 illustrates the object model used by Astra.

FIG. 7 pictorially illustrates the general architecture of Astra, as installed on a client computer 92. As illustrated, the architecture generally consists of a core Astra component 94 which communicates with a variety of different Astra plug-in applications 96 via a plug-in API 98. The Astra core 94 includes the basic functionality for the scanning and mapping of Web sites, and includes the above-described GUI features for facilitating navigation of Web site maps. Through the plug-in API 98, the Astra core 94 provides an extensible framework for allowing new applications to be written which extend the basic functionality of the Astra core. As described below, the architecture is structured such that the plug-in applications can make extensive use of Astra site maps to display plug-in specific information.

The Astra plug-ins 96 and API 98 are based on OLE Automation technology, which provides facilities for allowing the plug-in components to publish information to other objects via the operating system registry (not shown). (The "registry" is a database used under the Windows® 95 and Windows® NT operating systems to store configuration information about a computer, including information about Windows-based applications installed on the computer.) At start-up, the Astra core 94 reads the registry to identify the Astra plug-ins that are currently installed on the client computer 92, and then uses this information to launch the installed plug-ins.

In a preferred implementation, the architecture includes five Astra plug-ins: Link Doctor, Action Tracker, Test World, Load Wizard and Search Meter. The functions performed by these plug-ins are summarized by Table 2. Other applications which will normally be installed on the client computer in conjunction with Astra include a standard Web browser (FIGS. 11 and 12), and one or more editors (not shown) for editing URL content.

TABLE 2

| PLUG-IN | FUNCTION PERFORMED |
| --- | --- |
| Link Doctor | Fixes broken links automatically |
| Action Tracker | Retrieves and evaluates server log files to generate Web site activity data (such as activity levels on individual links), and superimposes such data on site map in a user-adjustable manner. |
| Test World | Generates and drives tests automatically |
| Load Wizard | Utilizes site map to automatically generate test scripts for the load testing of Web sites with Mercury Interactive's LoadRunner ™ and SiteTest ™ software packages. |
| Search Meter | Displays search engine results visually |

The Astra API allows external client applications, such as the plug-in applications 96 shown in FIG. 7, to communicate with the Astra core 94 in order to form a variety of tasks. Via this API, client applications can perform the following types of operations:

1. Superimpose graphical information on the site map;
2. Access information gathered by the Astra scanning engine in order to generate Web site statistics;
3. Attach custom attributes to the site map, and to individual nodes and links of the site map;
4. Access some or all of a Web page's contents (HTML) during the Web site scanning process;
5. Embed the Astra GUI within the client application;
6. Add menu items to the Astra menu; and
7. Obtain access to network functionality.

The specific objects and methods associated with the API are discussed below with reference to FIG. 8. In addition, a complete listing of the API is included in the microfiche appendix as Appendix B.

During the Web site scanning process, the Astra core 94 communicates over the Internet 110 (or an intranet) with the one or more Web server applications 112 ("Web servers") which make up the subject Web site 113. The Web servers 112 may, for example, run on a single computer, run on multiple computers located at a single geographic location (which may, but need not, be the location of the client computer 92), or run on multiple computers that are geographically distributed. In addition, the Web servers 112 of the Web site 113 may be virtually distributed across multiple Internet domains.

As is conventional with Internet applications, the Astra core 94 uses the TCP/IP layer 108 of the computer's operating system to communicate with the Web site 113. Any one or more of the Astra plug-ins 96 may also use the TCP/IP layer 108 to communicate with the Web site 113. In the preferred embodiment, for example, the Action Tracker plug-in communicates with the Web sites (via the Astra plug-in API) to retrieve server access log files for performing Web site activity analyses.

FIG. 8 illustrates the object model used by the Astra API. As illustrated, the model includes six classes of objects, all of which are implemented as OLE Automation objects. By name, the six object classes are Astra, Site Graph, Edges, Edge, Nodes, and Node. The Astra object 94 is an application object, and corresponds generally to the Astra core 94 shown in FIG. 7. The Astra object 94 accesses and manipulates data stored by a Site Graph object 114. Each Site Graph object corresponds generally to a map of a Web site, and includes information about the URLs and links (including links not displayed in the Visual Web Display view) of the Web site. The site-specific data stored by the Site Graph object 114 is contained within and managed by the Edges, Edge, Nodes and Nodes objects, which are subclasses of the Graph object.

Each Node object 115 represents a respective node (URL) of the site map, and each Edge object 116 represents a respective link between two URLs (nodes) of the map. Associated with each Node object and each Edge object is a set of attributes (not shown), including display attributes which specify how the respective object is to be represented graphically within the site map. For example, each Node object and each Edge object include respective attributes for specifying the color, visibility, size, screen position, and an annotation for the display of the object. These attributes can be manipulated via API calls to the methods supported by these objects 115, 116. For example, the Astra plug-ins (FIG. 7) can manipulate the visibility attributes of the Edge objects to selectively hide the corresponding links on the screen. (This feature is illustrated below in the description of the Action Tracker plug-in.) In addition, the Astra API includes methods for allowing the plug-ins to define and attach custom attributes to the Edge and Node objects.

The Nodes and Edges objects 118, 119 are container objects which represent collections of Node objects 115 and Edge objects 116, respectively. Any criterion can be used by the applications for grouping together Node objects and Edge objects. As depicted in FIG. 8, a single Graph object 114 may include multiple Nodes objects 118 and multiple Edges objects 119.

The methods of the Astra plug-in API generally fall into five functional categories. These categories, and the objects to which the associated methods apply, are listed below. Additional information on these methods is provided in the API listing in Appendix B.

ASTRA GUI METHODS. These methods control various aspects of the Astra GUI, such as adding, deleting, enabling and disabling Astra menu items. Supporting objects: Astra, Site Graph.

GROUPING AND ACCESS METHODS. These methods permit groupings of nodes and links to be formed, and permit the nodes and links within these groups to be accessed. Supporting objects: Site Graph, Nodes, Edges.

NODE/EDGE APPEARANCE METHODS. These methods provide control over display attributes (visibility, color, etc.) of links and nodes of the map. Supporting Objects: Node, Edge.

ATTRIBUTE ATTACHMENT METHODS. These methods permit the attachment of custom information to specific objects, and provide access to such information. Supporting objects: Site Graph, Node, Edge. Example use: Number of "hits" displayed by Action Tracker.

SCAN-TIME CONTENT ACCESS METHODS. These methods provide access by applications to Web page content retrieved during the scanning process. Supporting Objects: Site Graph, Node. Example use: At scan time, textual content of each page is passed to a spell checker application to perform a site-wide spell check.

As will be appreciated from the foregoing, the Astra architecture provides a highly extensible mapping framework which can be extended in functionality by the addition of new plug-ins applications. Additional aspects of the architecture are specified in the API description of Appendix B.

Figure 9:
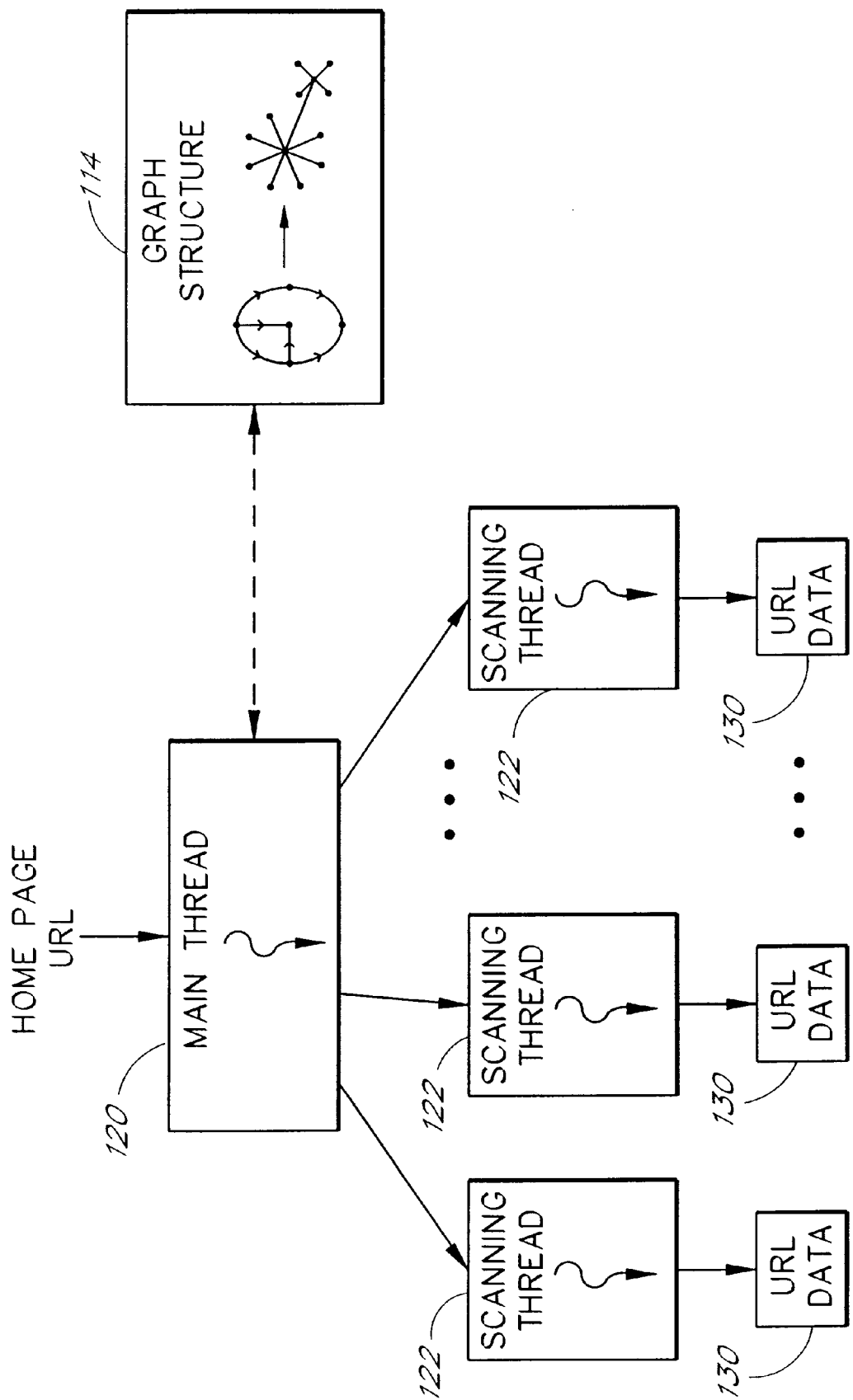
FIG. 9 illustrates a multi-threaded process used by Astra for scanning and mapping Web sites.
Figure 10:
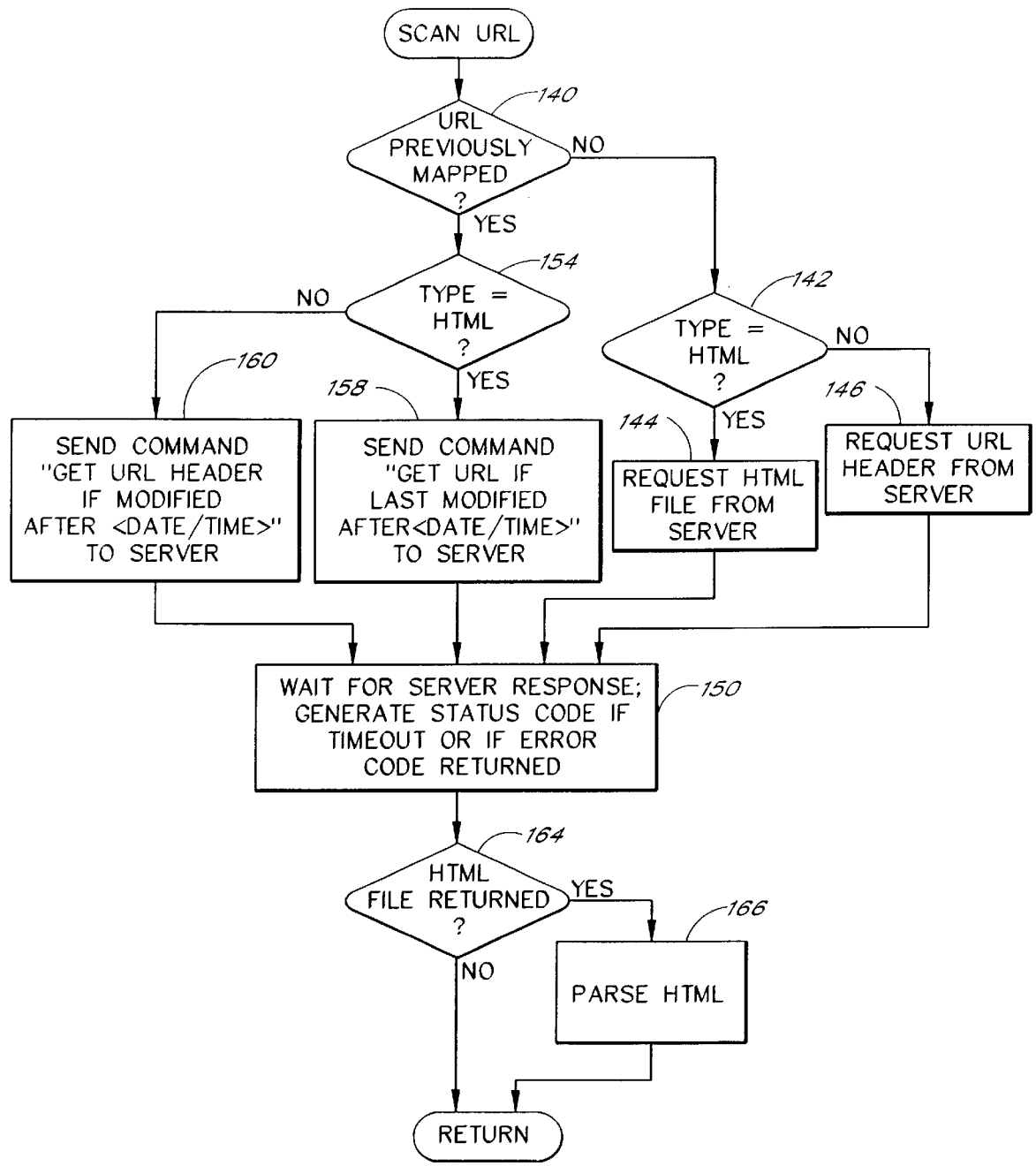
FIG. 10 illustrates the general decision process used by Astra to scan a URL.

VI. Scanning Process (FIGS. 9 and 10)

As will be apparent, the terms "node" and "link" are used in portions of the remaining description to refer to their corresponding object representations—the Node object and the Edge object.

The multi-threaded scanning process used by the Astra core 94 for scanning and mapping a Web site will now be described with reference to FIGS. 9 and 10. As depicted in FIG. 9, Astra uses two types of threads to scan and map the Web site: a main thread 122 and multiple lower-level scanning threads 122. The use of multiple scanning threads provides the significant benefit of allowing multiple server requests to be pending simultaneously, which in-turn reduces the time required to complete the scanning process. A task manager process (not shown) handles issues related to the management of the threads, including the synchronization of the scanning threads 120 to the main thread 120, and the allocation of scanning threads 122 to operating system threads.

The main thread 120 is responsible for launching the scanning threads 122 on a URL-by-URL basis, and uses the URL-specific information returned by the scanning threads 122 to populate the Site Graph object 114 ("Site Graph") with the nodes, links, and associated information about the Web site 113. In addition, as pictorially illustrated by the graph and map symbols in box 114, the main thread 120 periodically applies the Solar Layout method to the nodes and links of the Site Graph 114 to generate a map data structure which represents the Visual Web Display map of the Web site. (As described below, this map data structure is generated by manipulating the display attributes of the Node objects and Edge objects, and does not actually involve the generation of a separate data structure.)

Upon initiation of the scanning process by the user, the main thread 120 obtains the URL (address) of the home page (or the URL of some other starting location) of the Web site to be scanned. If the scanning process is initiated by selecting the "Automatic Update" option, the main thread 120 obtains this URL from the previously-generated Site Graph 114. Otherwise, the user is prompted to manually enter the URL of the home page.

Once the home page URL has been obtained, the main thread 120 launches a scanning thread 122 to scan the HTML home page. As the HTML document is returned, the scanning thread 122 parses the HTML to identify links to other URLs, and to identify other predetermined HTML elements (such as embedded forms) used by Astra. (As described below with reference to FIG. 10, if an Automatic Update is being performed, the scanning thread downloads the home page only if the page has been modified since the last scanning of the URL; if no download of the page is required, this outgoing link information is extracted from the previously-generated Site Graph 114.) In addition, the scanning thread 122 extracts certain information from the header of the HTML document, including the date/time of last modification, and the other information displayed in the List View window 78 of FIG. 4. The link and header information extracted by the scanning thread 122 is represented in FIG. 9 by one of the boxes 130 labeled "URL data."

Upon completion, the scanning thread 122 notifies the main thread 120 that it has finished scanning the home page. The main thread then reads the URL data extracted by the scanning thread 122 and stores this data in the Site Graph 114 in association with a Node object which represents the home page URL. In addition, for each internal link (i.e., link to a URL within the same Internet domain) identified by the scanning thread 122, the main thread 120 creates (or updates) a corresponding Edge object and a corresponding Node object within the Site Graph 114, and launches a new scanning thread 122 to read the identified URL. (Edge and Node objects are also created for links to external URLs, but these external URLs are not scanned in the default mode.) These newly-launched scanning threads then proceed to scan their respective URLs in the same manner as described above (with the exception that no downloading and parsing is performed when the subject URL is a non-HTML file). Thus, scanning threads 122 are launched on a URL-by-URL basis until either all of the URLs of the site have been scanned or the user halts the scanning process. Following the completion of the scanning process, the Site Graph 114 fully represents the site map of the Web site, and contains the various URL-specific information displayed in the Astra List View window 78 (FIG. 4). When the user saves a site map via the Astra GUI, the Site Graph 114 is written to disk.

In a default mode, links to external URLs detected during the scanning process are displayed in the site map using the "not scanned" icon (192 in FIG. 13), indicating that these URLs have not been verified. If the user selects a "verify external links" scanning option prior to initiating the scanning process, Astra will automatically scan these external URLs and update the map accordingly.

As part of the HTML parsing process, the scanning threads 122 detect any forms that are embedded within the HTML documents. (As described below, these forms are commonly used to allow the user to initiate back-end database queries which result in the dynamic generation of Web pages.) When a form is detected during an Automatic Update operation, the main thread 120 checks the Site Graph 114 to determine whether one or more datasets (captured by Astra as part of the Dynamic Scan feature) have been stored in association with the HTML document. For each dataset detected, Astra performs a dynamic page scan operation which involves the submission of the dataset to the URL specified within the form. This feature is further described below under the heading SCANNING AND MAPPING OF DYNAMICALLY-GENERATED PAGES.

Once the entire Web site has 113 been scanned, the Site Graph 114 represents the architecture of the Web site, including all of the detected URLs and links of the site. (If the user pauses the scanning process prior to completion, the Site Graph and VWD map represent a scanned subset of the Web site.) As described above, this data structure 114 is in the general form of a list of Node objects (one per URL) and Edge objects (one per link), with associated information attached as attributes of these objects. For each URL of the site, the information stored within the Site Graph typically includes the following: the URL type, the scanning status (OK, not found, inaccessible, unread, or access denied), the data and time of last modification, the URLs (addresses) of all incoming and outgoing links, the file size (if the URL was actually retrieved), an annotation, and the associated protocol.

Periodically during the scanning process, the main thread 120 executes a Visual Web Display routine which applies the Solar Layout method to the URLs and links of the Site Graph 114. (The term "routine," as used herein, refers to a functionally-distinguishable portion of the executable code of a larger program or software package, but is not intended to imply the modularity or callability of such code portion.) As indicated above, this method selects the links to be displayed within the site map (by selecting a span tree from the graph structure), and determines the layout and size for the display of the nodes (URLs) and non-hidden links of the map. The execution of this display routine results in modifications to the display attributes of the nodes (Node objects) and links (Edge objects) of the Site Graph 114 in accordance with the above-described layout and display principles. For example, for each link which is not present in the span tree, the visibility attribute of the link is set to "hidden." (As described below, link and node attributes are also modified in response to various user actions during the viewing of the map, such as the application of filters to the site map.)

In the preferred embodiment, the Visual Web Display routine is executed each time a predetermined threshold of new URLs have been scanned. Each time the routine is executed, the screen is automatically updated (in Visual Web Display format) to show the additional URLs that have been identified since the last execution of the routine. This allows the user to view the step-by-step generation of the site map during the scanning process. The user can selectively pause and restart the scanning process using respective controls on the Astra toolbar 46.

FIG. 10 illustrates the general decision process followed by a scanning thread 122 when a URL is scanned. This process implements the above-mentioned caching scheme for reducing unnecessary downloads of URLs and URL headers during Automatic Update operations. With reference to decision block 140, it is initially determined whether the URL has previously been scanned. If it has not been scanned, the thread either requests the file from the server (if the URL is an HTML file), or else requests the URL's header from the server, as illustrated by blocks 142–146. (URL headers are retrieved using the HEAD method of the HTTP protocol.) In either case, the scanning thread waits for the server to respond, and generates an appropriate status code (such as a code indicating that the URL was not found or was inaccessible) if a timeout occurs or if the server returns an error code, as indicated by block 150.

If, on the other hand, the URL has previously been mapped (block 140), the date/time of last modification stored in the Site Graph 114 (FIG. 9) is used to determine whether or not a retrieval of the URL is necessary. This is accomplished using standard argument fields of the HTTP "GET" method which enable the client to specify a "date/time of last modification" condition for the return of the file. With reference to blocks 158 and 160, the GET request is for the entire URL if the file is an HTML file (block 158), and is for the URL header if the file is a non-HTML file (block 160). Referring again to block 150, the thread then waits for the server response, and returns an appropriate status code if an error occurs.

As indicated by block 164, if an HTML file is returned as the result of the server request, the scanning thread parses the HTML and identifies any links within the file to other URLs. As indicated above, the main thread 120 launches additional scanning threads 122 to scan these URLs if any links are detected, with the exception that external links are not scanned unless a "verify external links" option has been selected by the user.

As indicated by the foregoing, the scanning process of the present invention provides a high degree of bandwidth efficiency by avoiding unnecessary retrievals of URLs and URL headers that have not been modified since the previous mapping, and by using multiple threads to scan the Web site.

VII. Scanning and Mapping of Dynamically-Generated Pages (FIGS. 11–15)

A feature of the invention which permits the scanning and mapping of dynamically-generated Web pages will now be described. By way of background, a dynamically-generated Web page ("dynamic page") is a page that is generated "on-the-fly" by a Web site in response to some user input, such as a database query. Under existing Web technology, the user manually types-in the information (referred to herein as the "dataset") into an embedded form of an HTML document while viewing the document with a Web browser, and then selects a "submit" type button to submit the dataset to a Web site that has back-end database access or real-time data generation capabilities. (Technologies which provide such Web server extension capabilities include CGI, Microsoft's ISAPI, and Netscape's NSAPI.) A Web server extension module (such as a CGI script) then processes the dataset (by, for example, performing a database search, or generating real-time data) to generate the data to be returned to the user, and the data is returned to the browser in the form of a standard Web page.

One deficiency in existing Web site mapping programs is that they do not support the automatic retrieval of dynamic pages. As a result, these mapping programs are not well suited for tracking changes to back-end databases, and do not provide an efficient mechanism for testing the functionality of back-end database search components. The present invention overcomes these deficiencies by providing a mechanism for capturing datasets entered by the user into a standard Web browser, and for automatically re-submitting such datasets during the updating of site maps. The feature of Astra which provides these capabilities is referred to as Dynamic Scan™.

Figure 11:
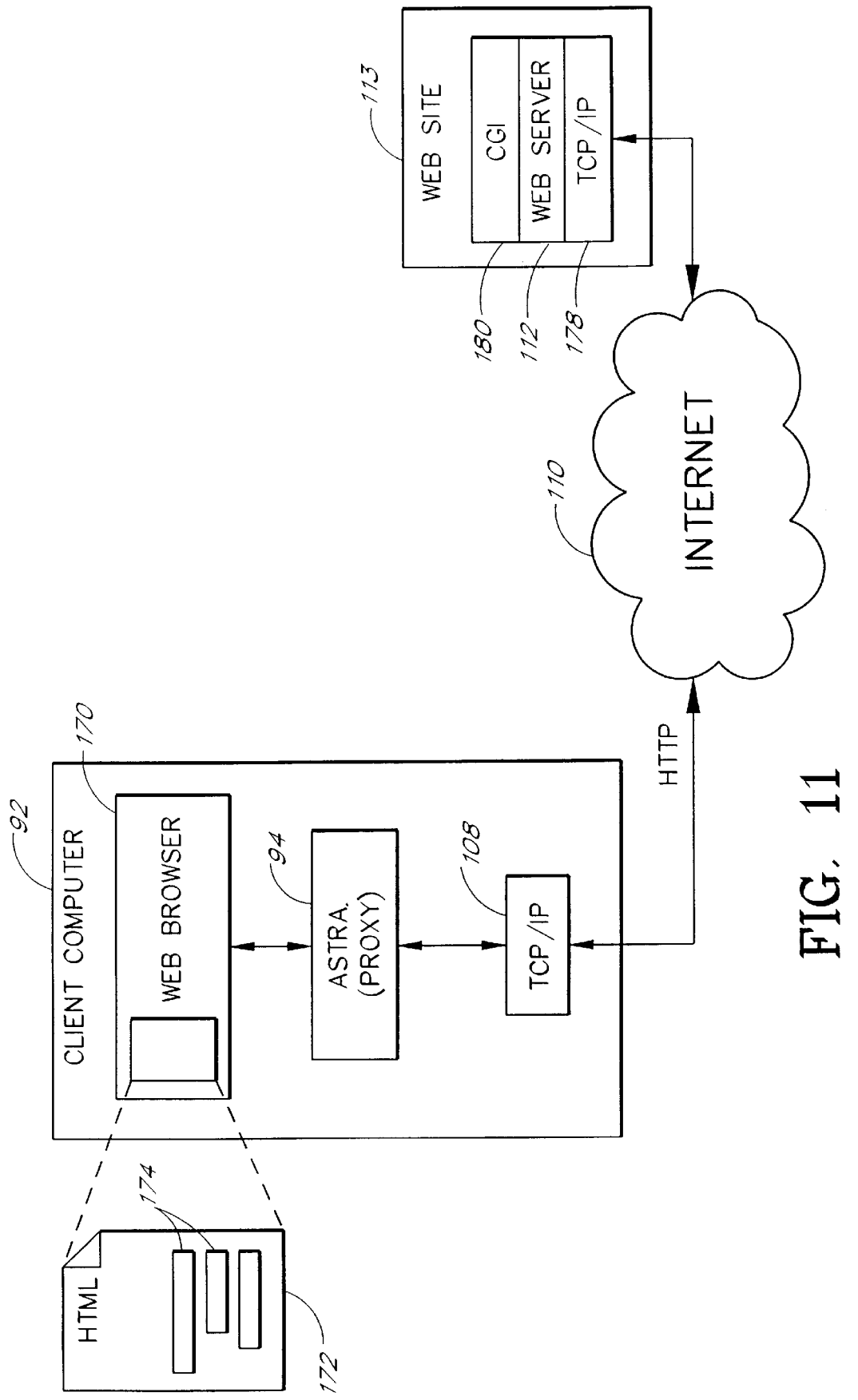
FIG. 11 is a block diagram which illustrates a method used by Astra to scan dynamically-generated Web pages.

FIG. 11 illustrates the general flow of information between components during a Dynamic Scan capture session, which can be initiated by the user from the Astra tool bar. Depicted in the drawing is a client computer 92 communicating with a Web site 113 over the Internet 110 via respective TCP/IP layers 108, 178. The Web site 113 includes a Web server application 112 which interoperates with CGI scripts (shown as layer 180) to generate Web pages on-the-fly. Running on the client computer 92 in conjunction with the Astra application 94 is a standard Web browser 170 (such as Netscape Navigator or Microsoft's Internet Explorer), which is automatically launched by Astra when the user activates the capture session. As illustrated, the Web browser 170 is configured to use the Astra application 94 as an HTTP-level proxy. Thus, all HTTP-level messages (client requests) generated by the Web browser 170 are initially passed to Astra 94, which in-turn makes the client requests on behalf of the Web browser. Server responses (HTML pages, etc.) to such requests are returned to Astra by the client computer's TCP/IP layer 108, and are then forwarded to the browser to maintain the impression of normal browsing.

During the Dynamic Scan capture session, the user types-in data into one or more fields 174 of an HTML document 172 while viewing the document with the browser 170. The HTML document 172 may, for example, be an internal URL which is part of a Web site map, or may be an external URL which has been linked to the site map for mapping purposes. When the user submits the form, Astra extracts the manually-entered dataset, and stores this dataset (in association with the HTML document 172) for subsequent use. When Astra subsequently re-scans the HTML document 172 (during an Automatic Update of the associated site map), Astra automatically retrieves the dataset, and submits the dataset to the Web site 113 to recreate the form submission. Thus, for example, once the user has typed-in and submitted a database query in connection with a URL of a site map, Astra will automatically perform the database query (and map the results, as described below) the next time an Automatic Update of the map is performed.

Figure 13:
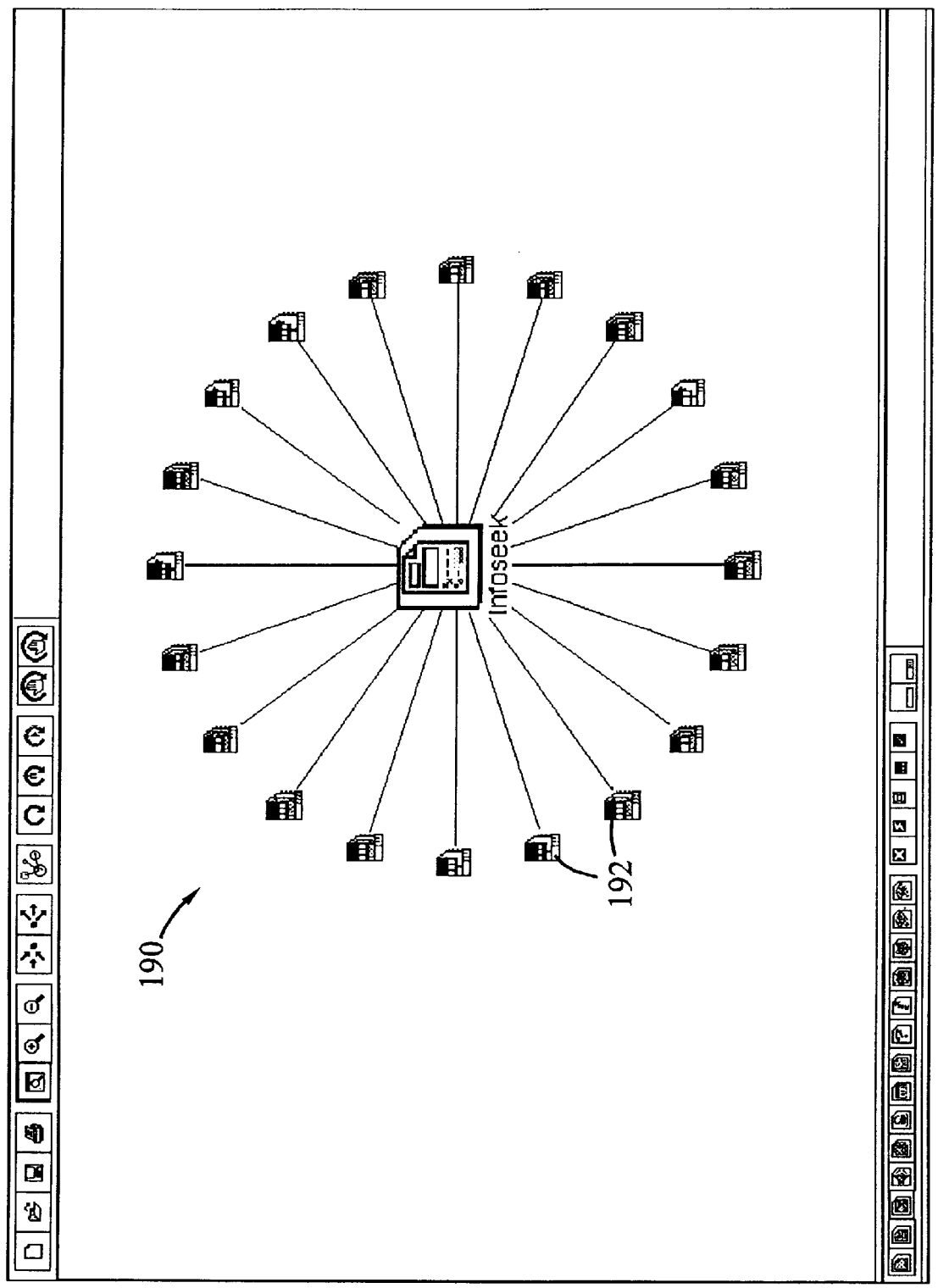
FIGS. 13–15 are a sequence of screen displays which further illustrate the operation of Astra's dynamic page scanning feature.
Figure 14:
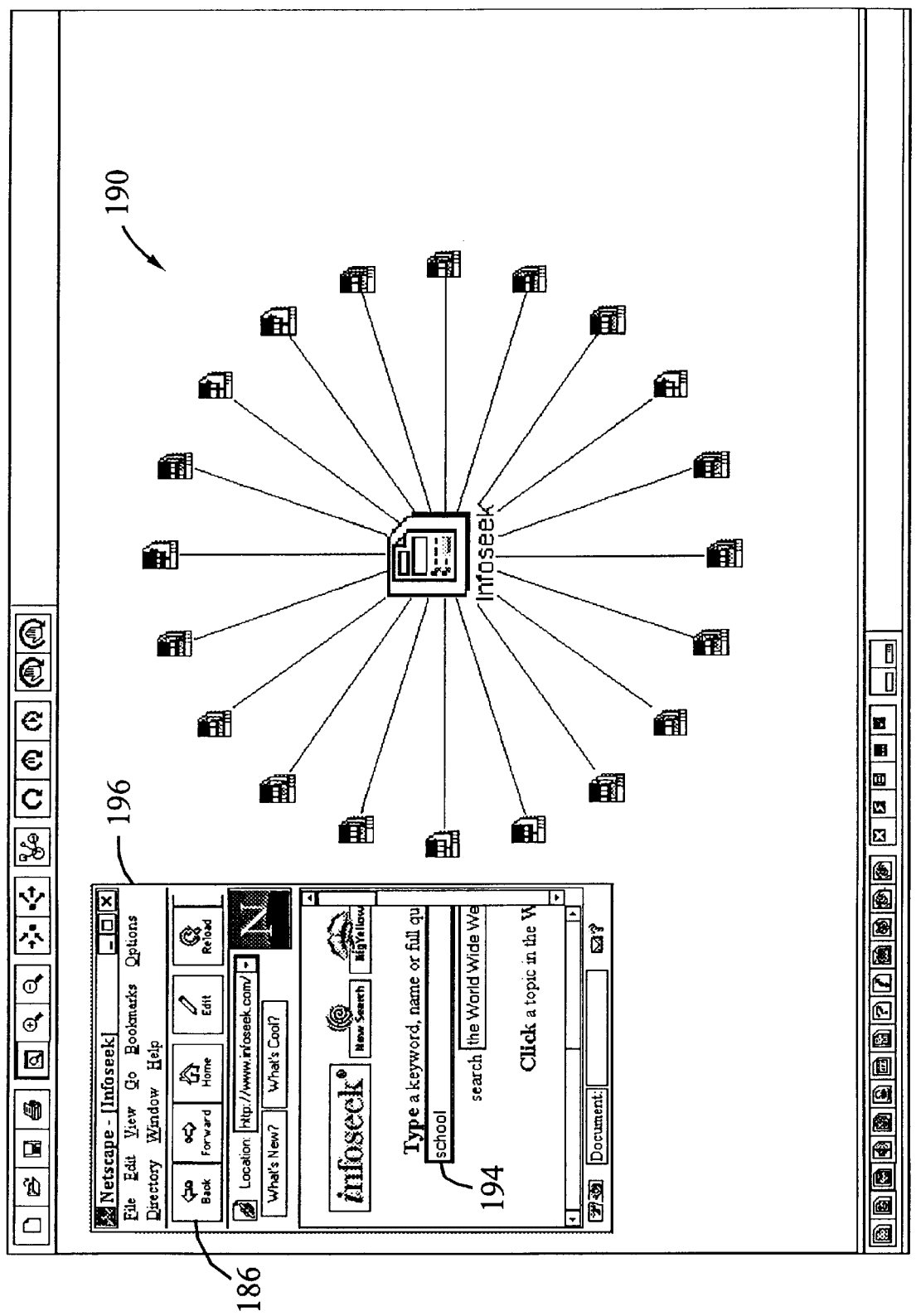
Figure 15:
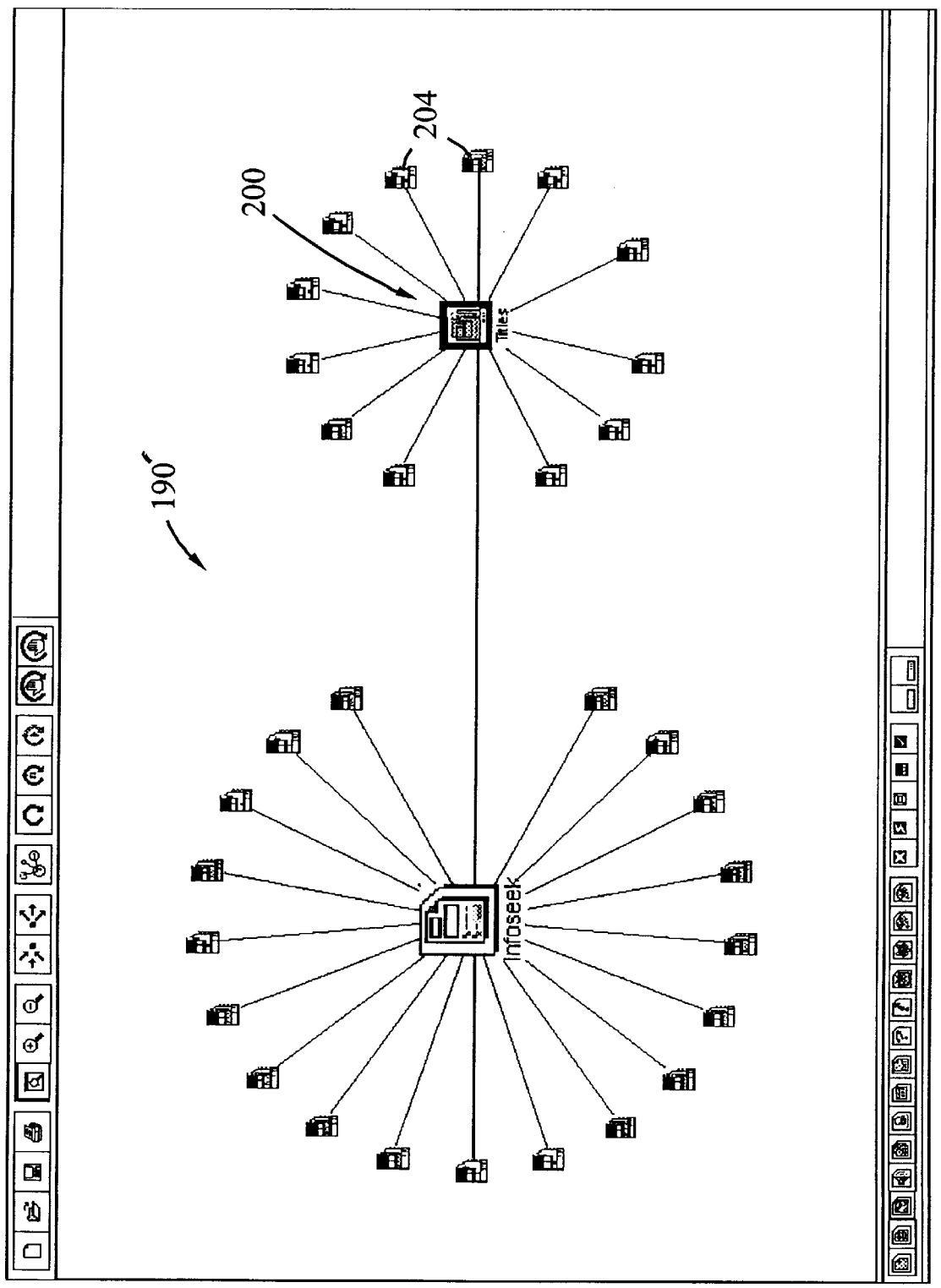

With further reference to FIG. 11, when the Web site 113 returns the dynamic page during the capture session (or during a subsequent Automatic Update session), Astra automatically adds a corresponding node to the site map, with this node being displayed as being linked to the form page. (Screen displays taken during a sample capture session are shown in FIGS. 13–15 and are described below.) In addition, Astra parses the dynamic page, and adds respective nodes to the map for each outgoing link of the dynamic page. (In the default setting, these outgoing links are not scanned.) Astra also parses any static Web pages that are retrieved with the browser during the Dynamic Scan capture session, and updates the site map (by appending appropriate URL icons) to reflect the static pages.

FIG. 12 illustrates the general flow of information during a Dynamic Scan capture session, and will be used to describe the process in greater detail. Labeled arrows in FIG. 12 represent the flow of information between software and database components of the client and server computers. As will be apparent, certain operations (such as updates to the map structure 128) need not be performed in the order shown.

Prior to initiating the Dynamic Scan session, the user specifies a page 172 which includes an embedded form. (This step is not shown in FIG. 12). This can be done by browsing the site map with the Astra GUI to locate the node of a form page 172 (depicted by Astra using a special icon), and then selecting the node with the mouse. The user then initiates a Dynamic Scan session, which causes the following dialog to appear on the screen: YOU ARE ABOUT TO ENTER DYNAMIC SCAN MODE. IN THIS MODE YOU WORK WITH A BROWSER AS USUAL, BUT ALL YOUR ACTIONS (INCLUDING FORM SUBMISSIONS) ARE RECORDED IN THE SITE MAP. TO EXIT FROM THIS MODE, PRESS THE "STOP DYNAMIC SCAN" BUTTON ON THE MAIN TOOLBAR OR CHOOSE THE "STOP DYNAMIC SCAN" OPTION IN THE SCAN MENU.

When the user clicks on the "OK" button, Astra modifies the configuration of the Web browser 170 within the registry 182 of the client computer to set Astra 94 as a proxy of the browser, as illustrated by arrow A of FIG. 12. (As will be recognized by those skilled in the art, the specific modification which needs to be made to the registry 182 depends upon the default browser installed on the client computer.) Astra then launches the browser 170, and passes the URL (address) of the selected form page to the browser for display. Once the browser has been launched, Astra modifies the registry 182 (arrow B) to restore the original browser configuration. This ensures that the browser will not attempt to use Astra as a proxy on subsequent browser launches, but does disable the browser's use of Astra as a proxy during the Dynamic Scan session.

As depicted in FIG. 12, the browser 170 retrieves and displays the form page 172, enabling the user to complete the form. In response to the submission by the user of the form, the browser 170 passes an HTTP-level (GET or POST) message to Astra 94, as indicated by arrow C. This message includes the dataset entered by the user, and specifies the URL (address) of the CGI script or other Web server extension component 180 to which the form is addressed. Upon receiving this HTTP message, Astra displays the dialog "YOU ARE ABOUT TO ADD A DATA SET TO THE CURRENT URL IN THE SITE MAP," and presents the user with an "OK" button and a "CANCEL" button.

Assuming the user selects the OK button, Astra extracts the dataset entered by the user and then forwards the HTTP-level message to its destination, as illustrated by arrow E. In addition, as depicted by arrow D, Astra stores this dataset in the Site Graph 114 in association with the form page 172. As described above, this dataset will automatically be retrieved and re-submitted each time the form page 172 is re-scanned as part of an Automatic Update operation. With reference to arrows F and G, when the Web server 112 returns the dynamic page 184, Astra 94 parses the page and updates the Site Graph 114 to reflect the page and any outgoing links of the dynamic page. (In this regard, Astra handles the dynamic page in the same manner as for other HTML documents retrieved during the normal scanning process.) In addition, as depicted by arrow H, Astra forwards the dynamic page 184 to the Web browser 170 (which in-turn displays the page) to maintain an impression of normal Web browsing.

Following the above sequence, the user can select the "stop dynamic scan" button or menu option to end the capture session and close the browser 170. Alternatively, the user can continue the browsing session and make additional updates to the site map. For example, the user can select the "back" button 186 (FIG. 14) of the browser to go back to the form page and submit a new dataset, in which case Astra will record the dataset and resulting page in the same manner as described above.

Although the system of the preferred embodiment utilizes conventional proxy technology to redirect and monitor the output of the Web browser 170, it will be recognized that other technologies and redirection methods can be used for this purpose. For example, the output of the Web browser could be monitored using conventional Internet firewall technologies.

FIGS. 13–15 are a sequence of screen displays taken during a Dynamic Scan capture session in which a simple database query was entered into a search page of the Infoseek™ search engine. FIG. 13, which is the first display screen of the sequence, illustrates a simple map 190 generated by opening a new map and then specifying http://www.infoseek.com/ as the URL. Displayed at the center of the map is the form page icon for the Infoseek™ search page. The 20 children 192 of the form page icon correspond to external links (i.e., links to URLs outside the infoseek.com domain), and are therefore displayed using the "not scanned" icon. (As described above, if the "verify external links" option of Astra is selected, Astra will verify the presence of such external URLs and update the map accordingly.)

FIG. 14 illustrates a subsequent screen display generated by starting a Dynamic Scan session with the Infoseek™ page selected, and then typing in the word "school" into the query field 194 of the page. (Intermediate displays generated by Astra during the Dynamic Scan session are omitted.) As illustrated in the figure, the Web browser comes up within a window 196, allowing the user to access the Astra controls and view the site map 190 during the Dynamic Scan session.

FIG. 15 illustrates the updated map 190' generated by Astra as a result of the FIG. 14 database query. The node (icon) 200 labeled "titles" in the map represents the dynamic page returned by the Infoseek™ Web site, and is depicted by Astra as being linked to the Infoseek™ form page. A special "dynamic page" icon 200 is used to represent this newly-added node, so that the user can readily distinguish the node from nodes representing statically-generated pages. The children 204 of the dynamic page node 200 represent outgoing links from the dynamic page, and are detected by Astra by parsing the HTML of the dynamic page. In the present example, at least some of the children 204 represent search results returned by the Infoseek™ search engine and listed in the dynamic page.

As generally illustrated by FIG. 15, in which the children 204 of the dynamic page 200 are represented with Astra's "not scanned," Astra does not automatically scan the children of the dynamically-generated Web page during the Dynamic Scan session. To effectively scan a child page 204, the user can retrieve the page with the browser during the Dynamic Scan session, which will cause Astra to parse the child page and update the map accordingly.

Following the sequence illustrated by FIGS. 13–15, the user can, for example, save the map 190' to disk, which will cause the corresponding Site Graph 114 to be written to disk. If the user subsequently retrieves the map 190' and initiates an Automatic Update operation, Astra will automatically submit the query "school" to the Infoseek™ search engine, and update the map 190' to reflect the search results returned. (Children 204 which do not come up in this later search will not be displayed in the updated map.) By comparing this updated map to the original map 190' (either manually or using Astra's map comparison tool), the user can readily identify any new search result URLs that were returned by the search engine.

While the above-described Dynamic Scan feature is particularly useful in Web site mapping applications, it will be recognized that the feature can also be used to in other types of applications. For example, the feature can be used to permit the scanning of dynamically-generated pages by general purpose Webcrawlers. In addition, although the feature is implemented in the preferred embodiment such that the user can use a standard, stand-alone Web browser, it will be readily apparent that the feature can be implemented using a special "built-in" Web browser that is integrated with the scanning and mapping code.

Figure 17:
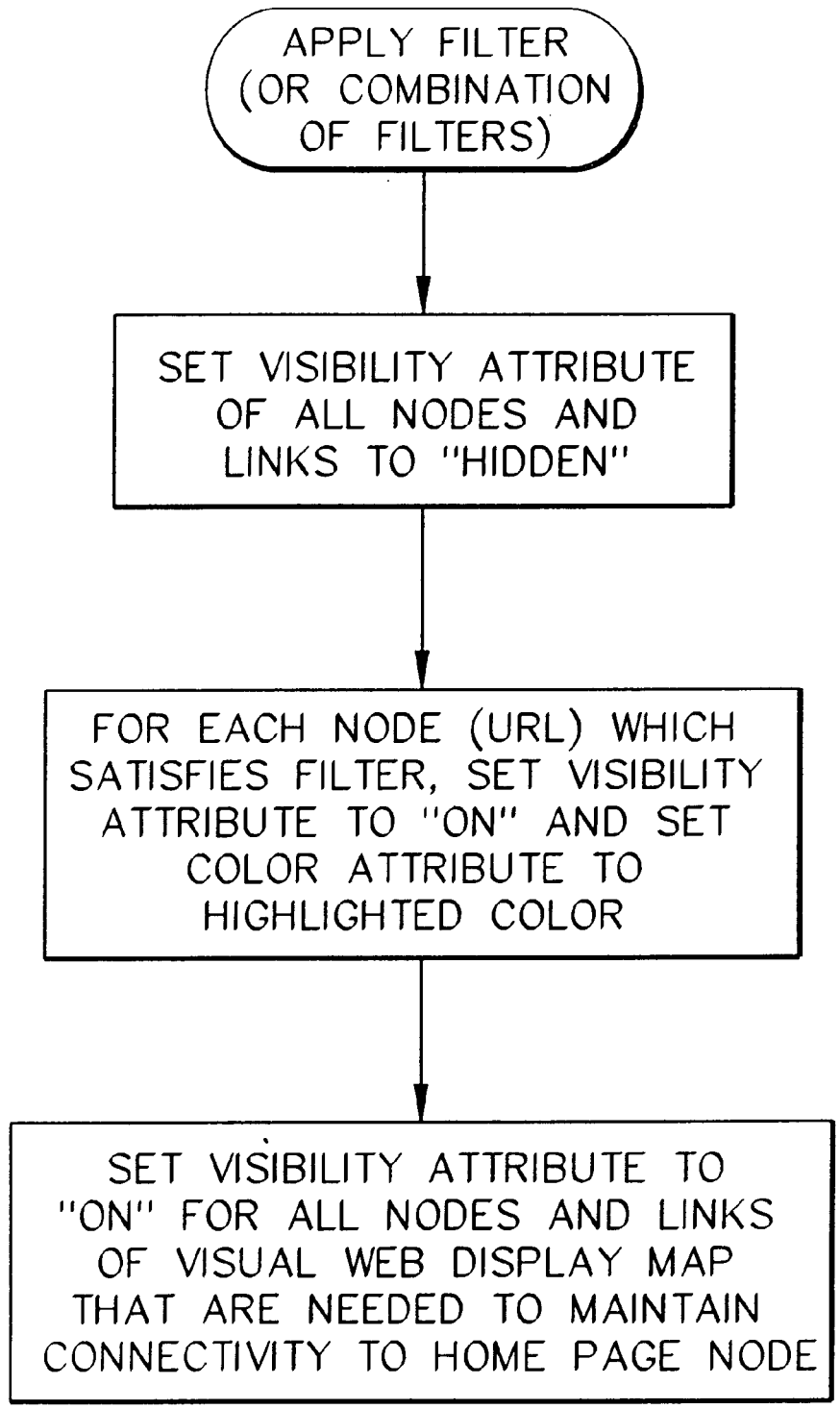
FIG. 17 illustrates the general program sequence followed by Astra to generate filtered maps of the type shown in FIG. 16.

VIII. Display of Filtered Maps (FIGS. 16–18)

The content, status and location filters of Astra provide a simple mechanism for allowing the user to focus-in on URLs which exhibit particular characteristics, while making use of the intuitive layout and display methods used by Astra for the display of site maps. To apply a filter, the user simply selects the corresponding filter button on the filter toolbar 47 while viewing a site map. (The specific filters that are available within Astra are listed above under the heading ASTRA GRAPHICAL USER INTERFACE.) Astra then automatically generates and displays a filtered version of the map. In addition to navigating the filtered map using Astra's navigation controls, the user can select the Visual Web Display button 73 (FIG. 16) to view the filtered map in Astra's VWD format. Combinations of the filters can be applied to the site map concurrently.

FIG. 16 illustrates the general display format used by Astra when a filter is initially applied to a site map. This example was generated by selecting the "hide OK URLs" button 220 on the filter toolbar 47 while viewing a site map similar to the map of FIG. 1. As illustrated by the screen display, the selection of the filter causes Astra to generate a filtered map 30' which is in the form of skeletal view of the original map, with only the links and URLs of interest remaining.

As generally illustrated by FIG. 16, the filtered map 30' consists primarily of the following components of the original map 30: (i) the URLs which satisfy (pass through) the filter, (ii) the links to the URLs which satisfy the filter, and (iii) all "intermediate" nodes and links (if any) needed to maintain connectivity between the root (home page) URL and the URLs which satisfy the filter. (This display methodology is used for all of the filters of the filter toolbar 47, and is also used when multiple filters are applied.) In this example, the filtered map 30' thus consists of the home page URL, all URLs which have a scanning status other than "OK," and the links and nodes needed to maintain connectivity to the non-OK URLs. To allow the user to readily distinguish between the two types of URLs, Astra displays the URLs which satisfy the filter in a prominent color (such as red) when the filtered map is viewed in a zoomed-out mode. The general process used by Astra to generate the skeletal view of the filtered map is illustrated by FIG. 17.

While viewing the filtered map, the user can perform any of a number of actions, such as zoom in and out to reveal additional URL information, launch editor programs to edit the displayed URLs, and apply additional filters to the map. In addition, the user can select the Visual Web Display button 73 to display the filtered map in Astra's VWD format. To restore the hidden nodes and links to the map, the user clicks on the selected filter button to remove the filter.

FIG. 18 illustrates the filtered map of FIG. 16 following selection by the user of the VWD button 73. As generally illustrated by these two figures, the selection of the VWD button 73 causes Astra to apply the Solar Layout method to the nodes and links of the filtered map. In addition, to provide the user with a contextual setting for viewing the remaining URLs, Astra restores the visibility of selected nodes and links in the immediate vicinity of the URLs that satisfy the filter. As generally illustrated by node icons 226, 228 and 230 in FIG. 18, an icon color coding scheme is used to allow the user to distinguish the URL icons which satisfy the filter from those which do not, and to allow the user to distinguish URLs which have not been scanned.

Figure 19:
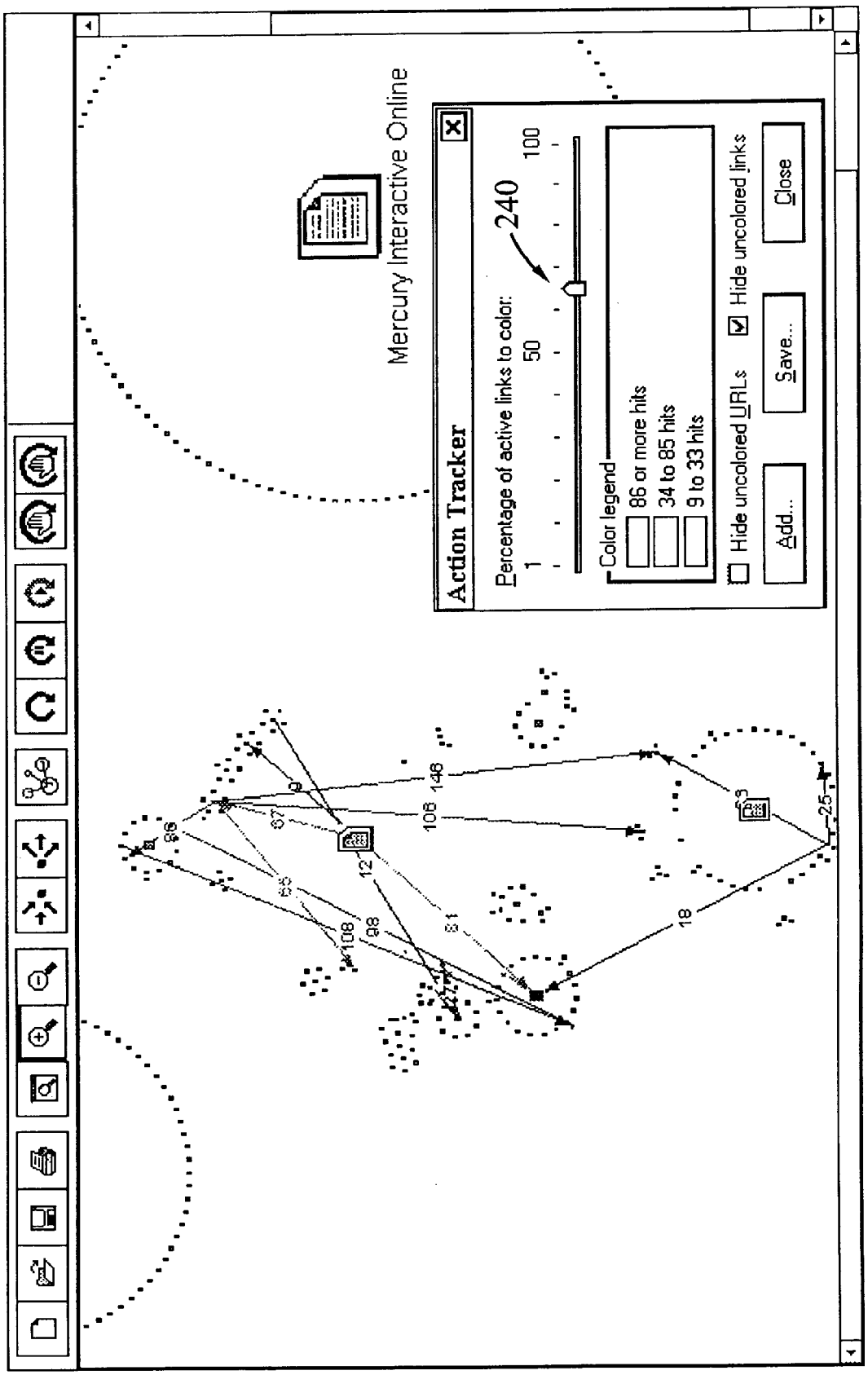
FIG. 19 is a screen display which illustrates an activity monitoring feature of Astra.
Figure 20:
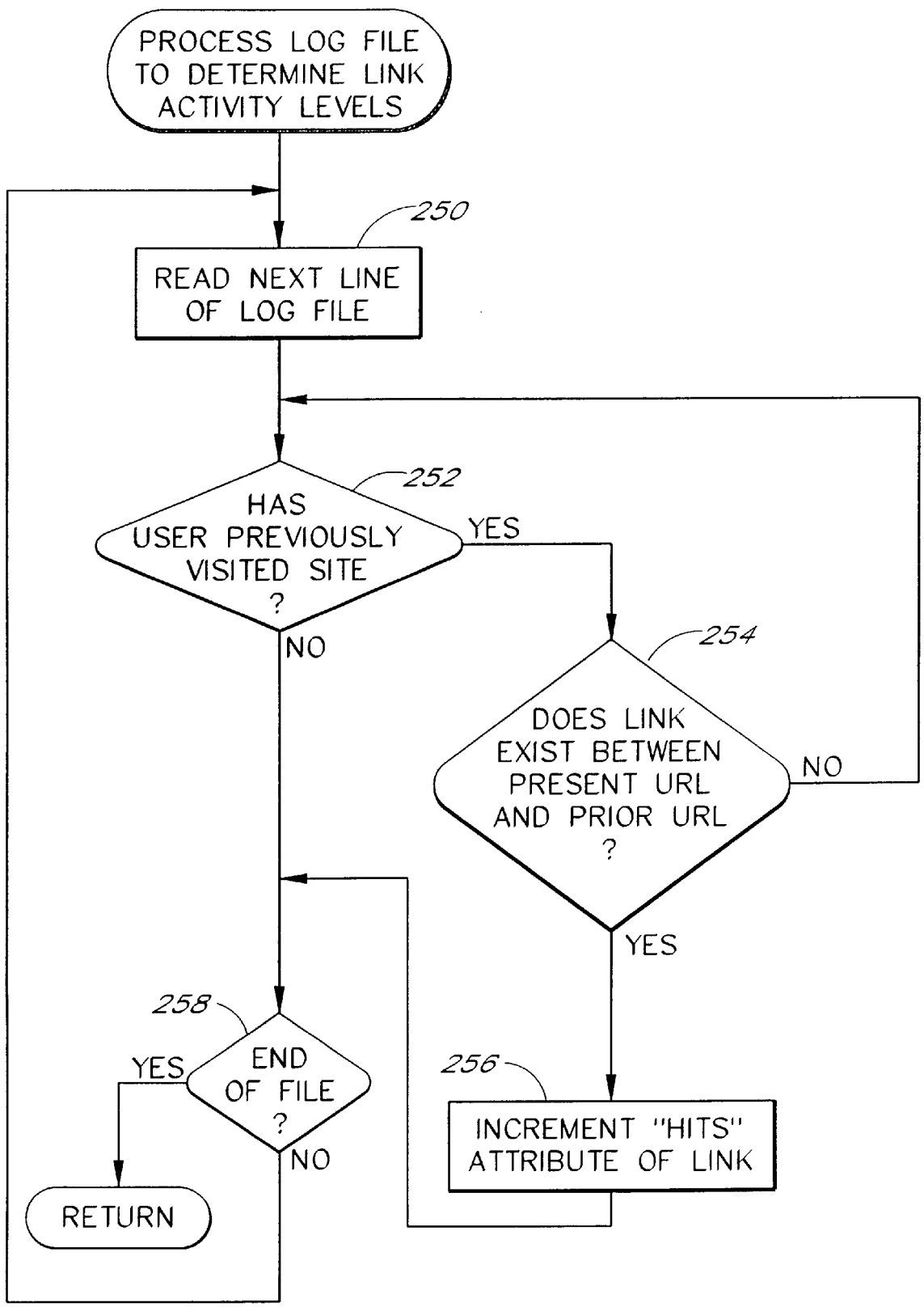
FIG. 20 illustrates a decision process used by Astra to generate link activity data (of the type illustrated in FIG. 19) from a server access log file.

IX. Tracking and Display of Visitor Activity (FIGS. 19 and 20)

An important feature of Astra is its the ability to track user (visitor) activity and behavior patterns with respect to a Web site and to graphically display this information (using color coding, annotations, etc.) on the site map. In the preferred embodiment, this feature is implemented in-part by the Action Tracker plug-in, which gathers user activity data by retrieving and analyzing server log files commonly maintained by Web servers. Using this feature, Webmasters can view site maps which graphically display such information as: the most frequently-accessed URLs, the most heavily traveled links and paths, and the most popular site entry and exit points. As will be appreciated by those skilled in the art, the ability to view such information in the context of a site map greatly simplifies the task of evaluating and maintaining Web site effectiveness.

By way of background, standard Web servers commonly maintain server access log files ("log files") which include information about accesses to the Web site by users. These files are typically maintained in one of two standard formats: the HTTP Server Access Log File format, or the HTTP Server Referrer Log File format. (Both of these formats are commonly used by Web servers available from Microsoft, Netscape, and NSCA, and both formats are supported by Astra.) Each entry (line) in a log file represents a successful access to the associated Web site, and contains various information about the access event. This information normally includes: the path to the accessed URL, an identifier of the user (typically in the form of an IP address), and the date and time of the access. Each log file stored on a physical server typically represents some window of time, such as one month.

In accordance with the invention, Astra uses the information contained within a log file in combination with the associated site graph to determine probable paths taken by visitors to the Web site. (The term "visitor" is used herein to distinguish the user of the Web site from the user of Astra, but is not intended to imply that the Web site user must be located remotely from the Web site.) This generally involves using access date/time stamps to determine the chronological sequence of URLs followed by each visitor (on a visitor-by-visitor basis), and comparing this information against link information stored in the site map (i.e., the Site Graph object 114) to determine the probable navigation path taken between the accessed URLs. (This method is described in more detail below.) By determining the navigation path followed by a visitor, Astra also determines the site entry and exits points taken by the visitor and all of the links traversed by the visitor. By performing this method for each visitor represented in the log file and appropriately combining the information of all of the visitors, Astra generates statistical data (such as the number of "hits" or the number of exit events) with respect to each link and node of the Web site, and attaches this information to the corresponding Node and Edge objects 115, 116 (FIG. 8) of the Site Graph 114.

To activate the Action Tracker feature, the user selects the Action Tracker option from the TOOLS menu while viewing a site map. The user is then presented with the option of either retrieving the server log file or loading a previously-saved Astra Activity File. Astra Activity Files are compressed versions of the log files generated by Astra and stored locally on the client machine, and can be generated and saved via controls within the Action Tracker controls. Astra also provides an option which allows the user to append a log file to an existing Astra Activity file, so that multiple log files can be conveniently combined for analysis purposes. Once the Activity File or server log file has been loaded, an Action Tracker dialog box (FIG. 19) opens which provides controls for allowing the user to selectively display different types of activity data on the map.

FIG. 19 illustrates the general display format used by the Action Tracker plug-in to display activity levels on the links of a site. As illustrated by the screen display, the links between URLs are displayed using a color-coding scheme which allows the user to associate different link colors (and URL icon colors) with different relative levels of user activity. As generally illustrated by the color legend, three distinct colors are used to represent three (respective) adjacent ranges of user activity.

In the illustrated display mode (uncolored links hidden, uncolored URLs not hidden), all of the URLs of the site map are displayed, but the only links that are displayed are those which satisfy a user-adjustable minimum activity threshold. Each visible link is displayed as a one-way arrow (indicating the link direction), and includes a numerical annotation indicating the total number of hits revealed by the log or activity file. The number of hits per URL can be viewed in List View mode in a corresponding column. As can be seen from an observation of the screen display, the displayed links include links which do not appear in the Visual Web Display view of the map.

With further reference to FIG. 19, a slide control 240 allows the user to adjust the "hits" thresholds corresponding to each of the three colors. By clicking and dragging the slide control, the user can vary the number of displayed links in a controllable manner to reveal different levels of user (visitor) activity. This feature is particularly useful for identifying congested links, which can be remedied by the addition of appropriate data redundancies.

FIG. 20 illustrates the general process used by the Action Tracker plug-in to detect the link activity data (number of hits per link) from the log file. The displayed flow chart assumes that the log file has already been retrieved, and that the attribute "hits" has been defined for each link (Edge object) of the Site Graph and set to zero. As illustrated by the flow chart, the general decision process is applied line-by-line to the log file (each line representing an access to a URL) until all of the lines have been processed. With reference to blocks 250 and 252, each time a new line of the log file is ready, it is initially determined whether or not the log file reflects a previous access by the user to the Web site. This determination is made by searching for other entries within the log file which have the same user identifier (e.g., IP address) and an earlier date/time stamp.

Blocks 254 and 256 illustrate the steps that are performed if the user (visitor) previously visited the site. Initially, the Site Graph is accessed to determine whether a link exists from the most-recently accessed URL to the current URL, as indicated by decision block 254. If such a link exists, it is assumed that the visitor used this link to get to the current URL, and the usage level ("hits" attribute) of the identified link is incremented by one. If no such link is identified between the most-recently accessed URL and the current URL, an assumption is made that the user back-tracked along the navigation path (by using the "BACK" button of the browser) before jumping to the current URL. Thus, decision step 254 is repeated for each prior access by the user to the site, in reverse chronological order, until either a link to the current URL is identified or all of the prior accesses are evaluated. If a link is detected during this process, the "hits" attribute of the link is incremented.

As indicated by block 258, the above process continues on a line-by-line basis until all of the lines of the log file have been processed. Following the execution of this routine, the "hits" attribute of each link represents an approximation (based on the above assumptions) of the number of times the link was traversed during the time frame represented by the log file.

As will be apparent, the general methodology illustrated by the FIG. 20 flow chart can be used to detect a variety of different types of activity information, which can be superimposed on the site map (by modifying node and link display attributes) in the same general manner as described above. The following are examples of some of the types of activity data that can be displayed, together with descriptions of several features of the invention which relate to the display of the activity data:

Exit Points. Exit points are deduced from the log file on a visitor-by-visitor basis by looking for the last URL accessed by each visitor, and by looking for large time gaps between consecutive accesses to the site. An "exits" attribute is defined for each node to keep track of the total number of exit events from each node. The color-coding scheme described above is then used to allow the user to controllably display different thresholds of exit events.

Usage Zones. When viewing a large site map in its entirety (as in FIG. 1), it tends to be difficult to identify individual URL icons within the map. This in-turn makes it difficult to view the color-coding scheme used by the Action Tracker plug-in to display URL usage levels. The Usage Zones™ feature alleviates this problem by enlarging the size of the colored URL icons (i.e., the icons of nodes which fall within the predetermined activity level thresholds) to a predetermined minimum size. (This is accomplished by increasing the "display size" attributes of these icons.) If these colored nodes are close together on the map, the enlarged icons merge to form a colored zone on the map. This facilitates the visual identification of high-activity zones of the site.

Complete Path Display. With this feature, the complete path of each visitor is displayed on the map on a visitor-by-visitor basis, with the visitor identifier and the URL access time tags displayed in the List View window 78 (FIG. 4). This feature permits fine-grain inspection of the site usage data, which is useful, for example, for analyzing security attacks and studying visitor behavior patterns.

Log Filters. Because server access log files tend to be large, it is desirable to be able to filter the log file and to display only certain types of information. This feature allows the user to specify custom filters to be applied to the log file for purposes of limiting the scope of the usage analysis. Using this feature, the user can, for example, specify specific time and date ranges to monitor, or limit the usage analysis to specific IP addresses or domains. In addition, the user can specify a minimum visit duration which must be satisfied before the Action Tracker will count an access as a visit.

X. Map Comparison Tool (FIG. 21)

Figure 21:
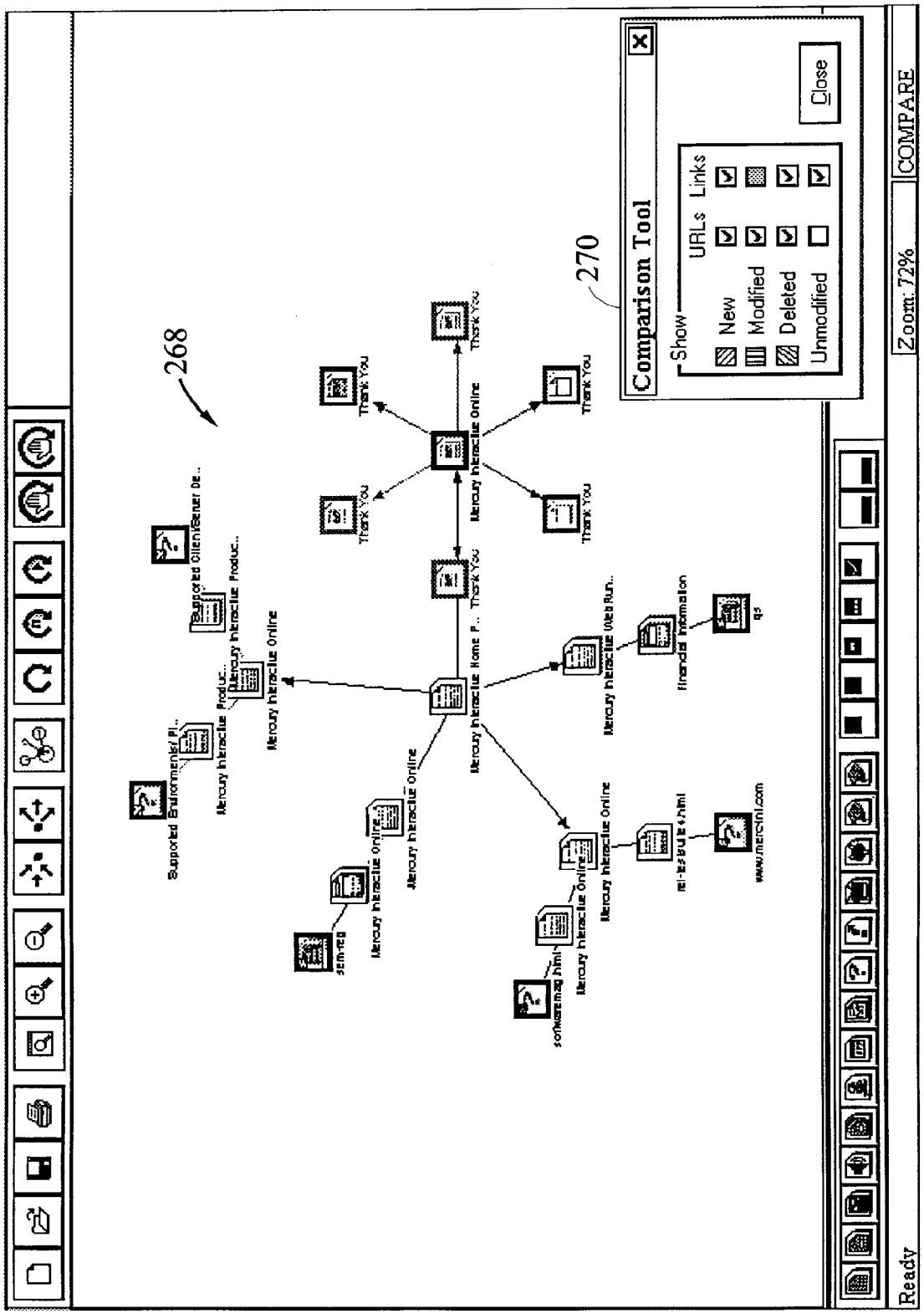
FIG. 21 is a screen display which illustrates a map comparison tool of Astra.

FIG. 21 illustrates a screen display generated using Astra's Change Viewer™ map comparison tool. As illustrated by the screen display, the comparison tool generates a comparison map 268 which uses a color-coding scheme to highlight differences between two site maps, allowing the user to visualize the changes that have been made to a Web site since a prior mapping of the site. Using the check boxes within the Change Viewer dialog box 270, the user can selectively display the following: new URLs and links, modified URLs, deleted URLs and links, and unmodified URLs and links. As illustrated, each node and link of the comparison map is displayed in one of four distinct colors to indicate its respective comparison status: new, modified, deleted, or unmodified.

To compare two maps, the user selects the "Compare Maps" option from the TOOLS menu while viewing the current map, and then specifies the filename of the prior map. Astra then performs a node-by-node and link-by-link comparison of the two map structures (Site Graphs) to identify the changes. This involves comparing the "URL" attributes of the associated Node and Edge objects to identify URLs and links that have been added and deleted, and comparing the "date/time of last modification" attributes of like Node objects (i.e., Node objects with the same "URL" attribute) to identify URLs that have been modified. During this process, a comparison map data structure is generated which reflects the comparison of the two maps, using color attributes to indicate the comparison outcomes (new, modified, deleted or unmodified) of the resulting nodes and links. Once the comparison map data structure has been generated, Astra applies the Solar Layout method to the structure and displays the comparison map 268 in Astra's VWD format. (The user can also view the comparison map in Astra's "incoming links" and "outgoing links" display modes.) The user can then adjust the "show" settings in the dialog box 270, which causes Astra to traverse the comparison map data structure and adjust the visibility attributes according to the current settings.

XI. Link Repair Plus-in (FIG. 22)

FIG. 22 illustrates the operation of Astra's Link Doctor plug-in. To access this feature, the user selects the "Link Doctor" option from the TOOLS menu while viewing a site map. The Link Doctor dialog box 284 then appears with a listing (in the "broken links" pane 286) of all of the broken links (i.e., URLs of missing content objects) detected within the site map. (Astra detects the missing links by searching the Site Graph for Node objects having a status of "not found.") When the user selects a URL from the broken links pane (as illustrated in the screen display), Astra automatically lists all of the URLs which reference the missing content object in the "appearing in" pane 288. This allows the user to rapidly identify all of the URLs (content objects) that are directly affected by the broken link.

In addition to listing all of the referencing URLs in the "appearing in" pane 288, Astra generates a graphical display (in Astra's "incoming links" display mode) which shows the selected (missing) URL 290 and all of the URLs 292 which have links to the missing URL. In this example, the missing URL is a GIF file which is embedded within eight different HTML files 292. From the display shown in FIG. 22, the user can select one of the referencing nodes 292 (by either clicking on its icon or its listing in the "appearing in" pane), and then select the "Edit" button 296 to edit the HTML document and eliminate the reference to the missing file.

XII. Conclusion

While certain preferred embodiments of the invention have been described, these embodiments have been presented by way of example only, and are not intended to limit the scope of the present invention. For example, although the present invention has been described with reference to the standard protocols, services and components of the World Wide Web, it should be recognized that the invention is not so limited, and that the various aspects of the invention can be readily applied to other types of web sites, including intranet sites and network sites that use proprietary client-server protocols. In addition, while the Web site mapping and map navigation features of the invention have been described in the context of a preferred Web site management and analysis program, these features can also be included within browser programs to facilitate the visualization and navigation of Web sites by visitors. Accordingly, the breadth and scope of the present invention should be defined only in accordance with the following claims and their equivalents.

In the claims which follow, reference characters used to designate claim steps are provided for convenience of description only, and are not intended to imply any particular order for performing the steps.

What is claimed is:

1. A computer-implemented method of representing a hierarchical node structure on a display screen, comprising:
    (a) identifying a plurality of parent nodes of the hierarchical node structure that have multiple immediate children nodes, including parent nodes at multiple different levels of the hierarchical node structure;
    (b) displaying a parent node identified in (a) on the display screen, and displaying the immediate children nodes of the parent node around the parent node over an angular range which exceeds 180 degrees; and
    (c) repeating (b) for multiple additional parent nodes identified in step (a), including parent nodes at multiple different levels of the hierarchical node structure, to generate, within a single view, a two-dimensional, non-hyperbolic map in which children nodes are positioned around their respective immediate parent nodes over said multiple levels of the hierarchical node structure.

2. The method of claim 1, wherein (b) comprises spacing a plurality of leaf nodes that share a common immediate parent node at substantially equal angular intervals around the common immediate parent node.

3. The method of claim 2, wherein (b) further comprises displaying the plurality of leaf nodes at substantially equal distances from the common immediate parent node.

4. The method of claim 1, wherein (b) comprises spacing a plurality of leaf nodes that share a common parent node at substantially equal distances from the common immediate parent node.

5. The method as in claim 1, further comprising generating the hierarchical node structure by applying a span tree algorithm to a representation of a web site.

6. The method as in claim 1, wherein a number of said multiple levels is at least three.

7. The method as in claim 1, wherein the method comprises displaying the hierarchical node structure as a tree in which a root node represents a home page of a Web site.

8. The method as in claim 1, further comprising, for each parent node, selecting a node display size which reflects a number of immediate children of that parent node.

9. A method of representing a hierarchical node structure on a display screen, comprising:
(a) positioning a parent node of the hierarchical node structure on the display screen, and positioning a plurality of immediate children nodes of the parent node at substantially uniform angular intervals around the parent node on the display screen to generate a parent-child node cluster; and
(b) repeating (a) for multiple additional parent nodes of the hierarchical node structure to generate, within a single view, a two-dimensional, non-hyperbolic map in which children nodes are positioned around their respective immediate parent nodes over multiple levels of the hierarchical node structure.

10. The method as in claim 9, wherein (a) comprises displaying a plurality of children nodes that share a common immediate parent node substantially circularly around the common immediate parent node.

11. The method as in claim 9, further comprising generating the hierarchical node structure by applying a span tree algorithm to a representation of a web site.

12. The method as in claim 9, wherein the method comprises spacing leaf nodes that share an immediate parent node away from the immediate parent node by a distance which is generally proportional to a total number of said leaf nodes that share the immediate parent.

13. The method as in claim 9, wherein a number of said multiple levels is at least three.

14. The method as in claim 9, wherein the method comprises displaying the hierarchical node structure as a tree in which a root node represents a home page of a Web site.

15. The method as in claim 9, further comprising selecting a display size of a parent node which is generally proportional to a number of immediate children of that parent node.

16. The method as in claim 9, wherein the method comprises spacing leaf nodes that share a common immediate parent node away from the immediate parent node by a distance which is generally proportional to a total number of said leaf nodes.

17. A computer-readable medium having stored thereon a computer program which, when executed by a computer, positions nodes on a display screen according to a node layout method to generate a two-dimensional, non-hyperbolic map of a hierarchical node structure such that, within a single view, children nodes of the hierarchical node structure are pictorially displayed within the map generally surrounding their respective immediate parent nodes over multiple parent-child levels of the hierarchical node structure.

18. The computer-readable medium as in claim 17, wherein the computer program positions leaf nodes that share a common immediate parent node at substantially equal angular intervals around the common immediate parent node over multiple parent-child levels of the hierarchical node structure.

19. The computer-readable medium as in claim 18, wherein the computer program displays the leaf nodes at substantially equal distances from the common immediate parent node.

20. The computer-readable medium as in claim 17, wherein the computer program displays leaf nodes that share a common immediate parent node at substantially equal distances from the common immediate parent node over multiple parent-child levels of the hierarchical node structure.

21. The computer-readable medium as in claim 17, wherein the computer program identifies the hierarchical node structure by at least scanning a web site to generate a representation of nodes and links of the web site, and applying a span tree algorithm to the representation of nodes and links.

22. The computer-readable medium as in claim 17, wherein a number of said multiple parent-child levels is at least three.

23. The computer-readable medium as in claim 17, wherein the computer program displays the hierarchical node structure as a tree in which a root node represents a home page of a Web site.

24. The computer-readable medium as in claim 17, wherein the computer program selects a display size of a parent node such that the display size is generally proportional to a number of immediate children of that parent node.

25. The computer-readable medium as in claim 17, wherein the computer program spaces leaf nodes that share an immediate parent node away from the immediate parent node by a distance which is directly proportional to a total number of said leaf nodes that share the immediate parent.

26. A computer-readable medium having stored thereon a computer program which, when executed by a computer, positions nodes on a display screen according to a node layout method to generate a two-dimensional, non-hyperbolic map of a hierarchical node structure such that, within a single view, leaf nodes of the hierarchical node structure that share a common immediate parent node are pictorially displayed substantially equidistant from, and at substantially equal angular intervals around, the common immediate parent node over multiple parent-child levels of the hierarchical node structure.

27. The computer-readable medium as in claim 26, wherein the computer program generates the map such that leaf nodes that share a common immediate parent node are displayed generally surrounding the common immediate parent node.

28. The computer-readable medium as in claim 26, wherein the computer program identifies the hierarchical node structure by at least scanning a web site to generate a representation of nodes and links of the web site, and applying a span tree algorithm to the representation of nodes and links.

29. The computer-readable medium as in claim 26, wherein a number of said multiple parent-child levels is at least three.

30. The computer-readable medium as in claim 26, wherein the computer program displays the hierarchical node structure as a tree in which a root node represents a home page of a Web site.

31. The computer-readable medium as in claim 26, wherein the computer program selects a display size of a parent node based on a number of immediate children of the parent node.

32. The computer-readable medium as in claim 26, wherein the computer program spaces leaf nodes that share an immediate parent node away from the immediate parent node by a distance which is directly proportional to a total number of said leaf nodes.

33. A computer-implemented method of representing a web site on a display screen, comprising:

identifying a structure of nodes and links of the web site;

reducing the structure of nodes and links to a tree representation having multiple parent-child levels; and graphically representing nodes and links of the tree structure on the display screen to generate a two-dimensional, non-hyperbolic map in which, at each of said multiple parent-child levels, a parent node is generally surrounded by the immediate children nodes of that parent node.

34. The method as in claim 33, wherein reducing the structure of nodes and links to a tree representation comprises applying a span tree algorithm to the structure of nodes and links.

35. The method as in claim 33, wherein graphically representing the nodes and links of the tree structure on the display screen further comprises displaying a set of leaf nodes circularly around an immediate parent node.

36. The method as in claim 33, wherein graphically representing the nodes and links of the tree structure on the display screen comprises selecting a display size of a node such that the display size is dependent upon a number of immediate children of that node.

37. The method as in claim 36, wherein said display size is directly proportional to said number of immediate children.

* * * * *